(12) United States Patent
Chaganty et al.

(10) Patent No.: US 7,055,173 B1
(45) Date of Patent: May 30, 2006

(54) FIREWALL POOLING IN A NETWORK FLOWSWITCH

(75) Inventors: Srinivas Chaganty, San Jose, CA (US); Makarand Kale, Sunnyvale, CA (US); Sathish Bommareddy, San Jose, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/540,238

(22) Filed: Apr. 1, 2000

Related U.S. Application Data

(63) Continuation of application No. 08/994,709, filed on Dec. 19, 1997, now Pat. No. 6,266,335, which is a continuation of application No. 08/992,038, filed on Dec. 19, 1997, now Pat. No. 6,601,084.

(51) Int. Cl.
  H04L 9/32 (2006.01)
(52) U.S. Cl. .................................. 726/11; 726/13
(58) Field of Classification Search ................ 713/200, 713/201, 202; 714/2, 3, 10; 709/104, 200, 709/201, 202, 203, 220, 219, 223, 225, 226
See application file for complete search history.

(56) References Cited

U.S. PATENT DOCUMENTS

| | | | |
|---|---|---|---|
| 5,283,897 A | 2/1994 | Georgiadis et al. |
| 5,301,226 A | 4/1994 | Olson et al. |
| 5,473,599 A | 12/1995 | Li et al. |
| 5,513,314 A | 4/1996 | Kandasamy et al. |
| 5,583,940 A | 12/1996 | Vidrascu et al. |
| 5,586,121 A | 12/1996 | Moura et al. |
| 5,608,447 A | 3/1997 | Farry et al. |
| 5,612,865 A | 3/1997 | Dasgupta |
| 5,612,897 A | 3/1997 | Rege |
| 5,634,125 A | 5/1997 | Li |

(Continued)

FOREIGN PATENT DOCUMENTS

JP 409321789 12/1997

(Continued)

OTHER PUBLICATIONS

Internet—"Quasi-Dynamic Load-Balancing (QDLB) Methods." Apr. 25, 1995, pp. 2 and 5.

(Continued)

*Primary Examiner*—Kim Vu
*Assistant Examiner*—Leynna T. Ha
(74) *Attorney, Agent, or Firm*—David Volejnicek

(57) ABSTRACT

A firewall fault-tolerant network interface system includes a switch circuit configured to detect when a firewall fails in a multi-firewall local network. When a failed firewall is detected, the switch circuit waits for a time-out period to expire to allow convergence. The switch circuit then intervenes when traffic from a server to the failed firewall is detected. The switch circuit translates the MAC address of the failed firewall to the MAC address of a functional firewall. Traffic from a server originally directed to the failed firewall is then redirected to a functional firewall. In a further refinement, the switch circuit provides the MAC address of a functional firewall in response to an ARP request from a server to the failed firewall. Thus, traffic from this server will be directed to the functional firewall without further intervention, reducing the overhead of the switch circuit. In still a further refinement, if the failed firewall recovers, the switch circuit waits for a time-out period to expire to allow convergence of external firewalls and to allow the recovered firewall to learn routes to known clients. The switch circuit then ceases all intervention for the MAC address of the now-recovered firewall.

62 Claims, 17 Drawing Sheets

U.S. PATENT DOCUMENTS

| | | | |
|---|---|---|---|
| 5,652,892 A | 7/1997 | Ugajin | |
| 5,655,140 A | 8/1997 | Haddock | |
| 5,666,487 A | 9/1997 | Goodman et al. | |
| 5,687,369 A | 11/1997 | Li | |
| 5,740,375 A | 4/1998 | Dunne et al. | |
| 5,754,752 A | 5/1998 | Sheh et al. | |
| 5,764,895 A | 6/1998 | Chung | |
| 5,774,660 A | 6/1998 | Brendel et al. | |
| 5,774,668 A | 6/1998 | Choquier et al. | |
| 5,796,941 A | 8/1998 | Lita | |
| 5,805,804 A | 9/1998 | Laursen et al. | |
| 5,812,819 A | 9/1998 | Rodwin et al. | |
| 5,815,668 A | 9/1998 | Hashimoto | |
| 5,828,833 A * | 10/1998 | Belville et al. | 395/187.01 |
| 5,835,696 A | 11/1998 | Hess | |
| 5,835,710 A | 11/1998 | Nagami et al. | |
| 5,862,338 A | 1/1999 | Walker et al. | |
| 5,864,666 A * | 1/1999 | Shrader | 395/187.01 |
| 5,898,830 A * | 4/1999 | Wesinger, Jr. et al. | 395/187.01 |
| 5,920,699 A | 7/1999 | Bare | |
| 5,936,936 A | 8/1999 | Alexander, Jr. et al. | |
| 5,949,753 A | 9/1999 | Alexander, Jr. et al. | |
| 5,951,634 A | 9/1999 | Sitborn et al. | |
| 5,959,990 A | 9/1999 | Frantz et al. | |
| 5,963,540 A | 10/1999 | Bhaskaran | |
| 5,999,536 A | 12/1999 | Kawafuji et al. | |
| 6,006,259 A | 12/1999 | Adelman et al. | |
| 6,006,264 A | 12/1999 | Colby et al. | |
| 6,047,319 A | 4/2000 | Olson | |
| 6,078,957 A | 6/2000 | Adelman et al. | |
| 6,097,882 A | 8/2000 | Mogul | |
| 6,098,093 A | 8/2000 | Bayeh et al. | |
| 6,101,616 A | 8/2000 | Joubert et al. | |
| 6,108,300 A * | 8/2000 | Coile et al. | 370/217 |
| 6,141,755 A * | 10/2000 | Dowd et al. | 713/200 |
| 6,226,684 B1 | 5/2001 | Sung et al. | |
| 6,266,335 B1 | 7/2001 | Bhaskaran | |
| 6,295,276 B1 | 9/2001 | Datta et al. | |
| 6,356,985 B1 | 3/2002 | Ichimi et al. | |
| 6,389,448 B1 | 5/2002 | Primak et al. | |
| 6,397,260 B1 | 5/2002 | Wils et al. | |
| 6,484,261 B1 * | 11/2002 | Wiegel | 713/201 |
| 6,530,032 B1 * | 3/2003 | Shew et al. | 714/4 |
| 6,606,708 B1 | 8/2003 | Devine et al. | |
| 6,647,400 B1 | 11/2003 | Moran | |

FOREIGN PATENT DOCUMENTS

| | | |
|---|---|---|
| WO | WO 99/32956 | 7/1999 |

OTHER PUBLICATIONS

IBM, Document Identifier: NN9305363 "Value-Oriented Approach To Selecting *Buckets* For Dat Redistribution," West, May 1, 1993.

Internet—Becker, Wolfgang, "Dynamic Load Balancing For Parallel Database Processing," Institute of Parallel and Distributed High-Performance Systems (IPVR), University of Stuttgart Breitwiesenstr, Stuttgart, Germany, 1997.

Omiecinski, Edward, "Performance Analysis of a Load Balancing Hash-Join Algorithm for a Shared Memory Multiprocessor," The ACM Sigmod Anthology, 17th International Conference of Very Large Data Bases, Sep. 3, 1991.

* cited by examiner

FIREWALL POOLING IN A NETWORK FLOWSWITCH

CROSS REFERENCE TO RELATED APPLICATIONS

Continuation of application Ser. No. 08/994,709, filed Dec. 19, 1997 now U.S. Pat. No. 6,266,335, entitled "Cross-Platform Server Clustering Using A Network Flow Switch," discloses and claims flow switch features used in the system of this invention. U.S. Pat. No. 5,963,540 entitled "Router Pooling in a Network Flow Switch," discloses and claims router fault-tolerance and router load-balancing features used in the system of this invention. Continuation of application Ser. No. 08/992,038, filed Dec. 19, 1997 now U.S. Pat. No. 6,601,084, entitled "Dynamic Load Balancer for Multiple Network Servers" discloses and claims load-balancing used in the system of this invention. Co-pending application Ser. No. 09/540,296 entitled "Router Clustering for Multiple Network Servers" discloses and claims pooling used in the system of this invention. Co-pending application Ser. No. 09/540,297 entitled "Firewall Clustering for Multiple Network Servers." All cited applications and the patent are incorporated herein by reference in their entirety.

CROSS REFERENCE TO APPENDIX

This patent application includes microfiche Appendix A which is a part of the present disclosure and which is incorporated by reference herein in its entirety. This Appendix consists of a total of 34 sheets that contain a total of 3,271 frames. Appendix A is a listing of software code of embodiments of the present invention, which are described more completely below.

BACKGROUND

The growth of networking and the popularity of the Internet have created a need to improve the performance and reliability of network architectures. For example, FIG. 1 shoes a block diagram of a local network 100 according to a conventional network architecture Network 100 is connected to a network backbone 102 that connects several external networks. Backbone 102 may be, for example, the Internet or an Intranet. In this example, network 100 includes a firewall 104 connected to backbone 102 through an interface 105. Network 100 also includes a first server 106 connected to firewall 104 through an interface 107, and a second server 108 connected to firewall 104 through an interface 109. In this example, network 100 uses the TCP/IP communication protocols, which are well known in the art of networking.

Clients connected to backbone 102 may send packets to a specific server in network 100 (e.g., server 106) through firewall 104. Conversely, server 106 may send packets to the client through firewall 104 and onto backbone 102. However, network 100 is not fault-tolerant, in that firewall 104 represents a possible single point failure for network 100. More specifically, when firewall 104 fails, servers 106 and 108 can no longer communicate with clients connected to backbone 102. In particular, servers are typically not configured to detect failure of "first hop" firewalls (i.e., the first firewall encountered by an outbound packet from a server). Thus, the servers will continue to send packets to the failed firewall, never knowing that the outbound packets do not leave network 100 (sometimes referred to as a "black hole" for outbound traffic).

One conventional scheme to eliminate this single-point failure is to include a second firewall in the local network. FIG. 2 shows a block diagram of a network 200 according to such a conventional scheme. In this example, network 200 includes a second firewall 202 connected to backbone 102 through an interface 203. Firewalls 202 and 104 are connected to a shared medium 204 (e.g., Ethernet cable) through interfaces 206 and 208. Servers 106 and 108 are connected to shared medium 204 through interfaces 210 and 212, respectively. Although the second firewall 202 does provide fault-tolerance, the use of shared medium 204 undesirably increases the complexity of network 200 and degrades the performance of network 200.

In one implementation of this conventional scheme, fault-tolerance is mainly implemented on the servers. In particular, the servers are special servers configured to listen to the firewall information protocol (RIP) and can detect the failure of a firewall. Then these servers can adapt to reconfigure themselves to change the default firewall. However, this scheme places a large burden on the server to listen and process the complete routing table that exists in the network. Consequently, server performance is significantly impacted by this scheme, which, of course, is undesirable. Further, this processing of the RIP information takes on the order of several minutes, which is a relatively long time to correct a firewall failure. This relatively-long correction-time undesirably allows a significant number of packets to be sent to the "black hole."

In another scheme that is implemented in the firewalls as well as in the servers, servers 106 and 108 are configured with a "virtual" Internet protocol (IP) address different from the regular interface IP addresses of firewalls 202 and 104. Firewalls 202 and 104 are configured with a virtual IP address and monitor every packet on shared media 204. Thus, when one firewall fails, the other firewall detects this failure and can then handle the packets of the failed firewall.

Although this virtual IP address scheme may represent an improvement in detection of a failed firewall over the previously-described scheme, several problems remain. For example, this scheme is intrusive in that this scheme requires the use of special firewalls and specially-configured servers that support this virtual-address scheme. Thus, this scheme may not be practical for a user already having a significant investment in servers and firewalls that do not support these virtual-address features. In addition, the presence of a third firewall IP address may confuse the network management system used by the user.

SUMMARY

A method in accordance with the invention provides protection against failure of a firewall, by pooling a number of firewalls, detecting failure of a firewall, and automatically sending packets that were addressed to the failed firewall to one of the other firewalls. The number of firewalls being pooled can be just two, or any number more than two. Pooling of firewalls as described above eliminates a single point of failure of the type described above. For example, if the pool contains three firewalls, then when a first firewall fails, a second firewall is used automatically, and when the second firewall fails, a third firewall is used automatically.

In one embodiment, at least one of the firewalls is set up as a default gateway for computers on an enterprise network that is being protected by the firewall. In this embodiment, each packet to be transmitted outside the enterprise network has addresses related to layers three and two of the Open Systems Interconnection (OSI) standard (e.g., an IP address and a MAC address) of the firewall that acts as the default gateway. In case of a failure of a firewall of this embodiment, the layer-2 address of the failed firewall is automatically replaced by the layer-2 address of another firewall in the pool of firewalls.

In one implementation, detection of failure and redirection of packets is performed in a circuit (hereinafter "switch circuit") that leaves the packets unchanged until the failure occurs. Specifically, the switch circuit uses a table to transfer packets from one port to another port based on the layer-2 address of the destination (and builds the table based on the layer-2 address of the source). If the switch circuit does not find a match in the table, the switch circuit broadcasts the packet on all the ports.

In a first embodiment (e.g., implemented using the TCP/IP standard), the firewalls are connected to the Internet. The firewalls of this embodiment are connected to the enterprise network through a switch circuit of the type described above. The switch circuit connects the firewalls to the enterprise network with a switching mechanism (e.g., switched Ethernet), instead of shared media. Such use of the switch circuit provides significantly-higher bandwidth than the bandwidth of a conventional shared media system.

Moreover, the firewalls that are being pooled need not be identical to one another. In one embodiment, each firewall in a pool is manufactured by a different manufacturer than another firewall in the pool. In a second embodiment, the firewalls are connected to a backbone via a switch circuit (also called "first switch circuit") of the type described above. The firewalls of this embodiment are also connected to the enterprise network through another switch circuit (also called "second switch circuit") that is similar or identical to the first switch circuit.

In one implementation, transmission media that couple the two firewalls to each of the first switch circuit and the second switch circuit are not shared. For example, each firewall is individually coupled to the first switch circuit. Moreover, each firewall is also individually coupled to the second switch circuit. Therefore, in this implementation, there are at least four individual couplings, each of which is dedicated to carrying traffic between only two devices (a firewall and a switch circuit) that are coupled at the two ends of the couplings. Such individual couplings (e.g., 10/100 Mbps Ethernet connections) provide significantly-higher bandwidth than the bandwidth of a medium that is shared with other devices. In another aspect of the present embodiment, the switch circuit does not use a virtual address, thereby simplifying network configuration and network management.

In one embodiment, each switch circuit detects failure of a firewall by sending a request message through the firewall to the other switch circuit. If a reply from the other switch circuit is not received within a predetermined time interval, the requested firewall is treated as failed. In this embodiment, when a firewall fails, the switch circuit replaces MAC addresses in all packets addressed to the failed firewall with MAC addresses of another firewall (also called "replacement firewall") in the pool, and thereafter forwards the packets to the replacement firewall. Therefore, the switch circuit redirects all outbound traffic originally directed to the failed firewall to a functional firewall. Thereafter, when a failed firewall recovers, the just-described act of replacing MAC addresses is discontinued, thereby to allow the packets to proceed to the recovered firewall.

The just-described replacement of MAC addresses is done transparently and non-intrusively to the enterprise network, to the routers, and to the firewalls. Thus, there is no need to make non-standard reconfigurations to support firewall fault-tolerance, except as follows. Specifically, when the firewalls are configured to perform Network Address Translation (NAT), a rule is added to each of the firewalls to maintain unchanged an internet protocol (IP) address of a source of the request message passing therethrough. Such a "hole" in the firewall enables a switch circuit that receives a request message from another switch circuit (of a specified IP address) to respond to the request message, in the normal manner.

In one embodiment, the switch circuit detects failed firewalls by periodically (e.g., every 5 seconds) sending Address Resolution Protocol (ARP) requests and waits for an ARP response from the firewall. If an ARP response is not received within a predetermined time period (e.g., 5 seconds) then the switch circuit may retry a predetermined number of times (e.g., 3 times or even 0 times). Alternatively, the switch circuit can be configured to "ping" the firewalls at user-configured predetermined intervals using the standard ICMP Echo Request feature to check whether the firewalls are functioning. If the switch circuit still does not receive a response, the firewall is treated as failed and another firewall in the pool that is known to be functional is used (e.g., by replacing in the header of each packet passing through the switch the layer-2 address of the failed firewall with the layer-2 address of the functional firewall).

In a further aspect of the present invention, when the servers eventually send Address Resolution Protocol (ARP) requests to the failed firewall (i.e., when the servers' ARP cache timers expire), the switch circuit responds to the ARP request with the MAC address of a functional firewall instead of the address MAC of the failed firewall. Because subsequent outbound traffic from the servers will now be automatically directed to the functional firewall, the switch circuit no longer needs to intervene. Thus, a significant amount of the burden on the switch circuit is eliminated, restoring the switching performance of the switch circuit.

In still another aspect of the present invention, the switch circuit detects if the failed firewall has recovered. When a recovered firewall is detected, the switch circuit waits for another time-out period to expire to help ensure synchronization of external firewalls. Then the switch circuit ceases all intervention for the now-recovered firewall. As a result, when the recovery occurs before the ARP cache timers expire, the servers' ARP caches still contain the MAC address of the recovered firewall. Thus the switch circuit simply responds to outbound traffic directed to the recovered firewall in the normal manner. In contrast, when the recovery occurs after the servers' ARP caches have been updated with the MAC address of another firewall, the servers will continue to direct outbound traffic to this other firewall until the ARP cache timers expire again, so that the servers can be updated with the MAC address of the recovered firewall. Thus, unlike the aforementioned conventional schemes, a local network according to the present invention provides a relatively-fast, high-bandwidth, and non-intrusive firewall fault-tolerance feature.

DETAILED DESCRIPTION

Figure 1:
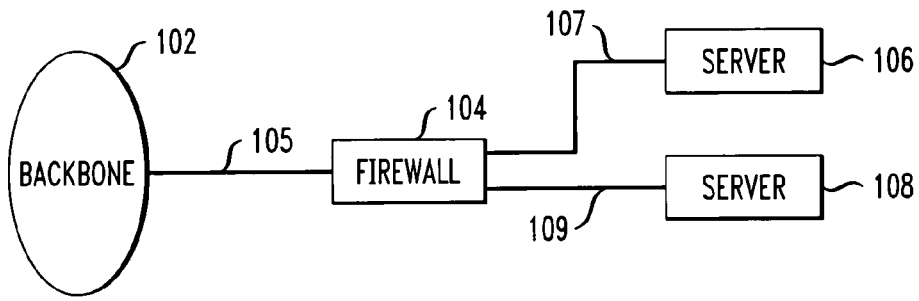
FIG. 1 is a block diagram of a conventional network architecture.
Figure 2:
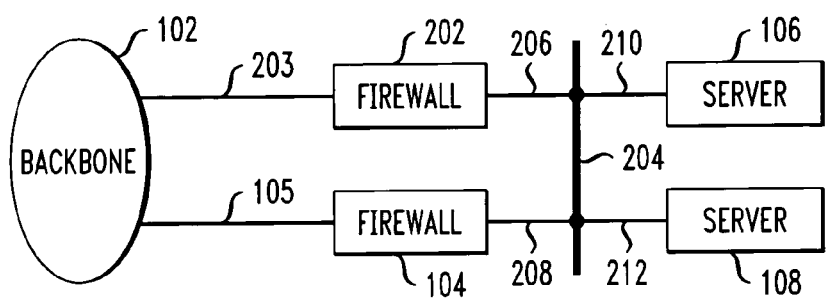
FIG. 2 is a block diagram of a conventional network architecture using a shared media to provide firewall fault-tolerance.
Figure 3:
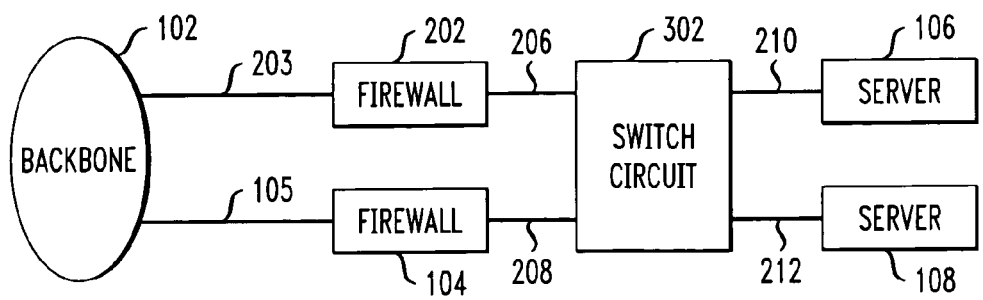
FIG. 3 is a block diagram of a network with a switch circuit for providing firewall fault-tolerance, in accordance with one embodiment of the present invention.

FIG. 3 is a block diagram of a network 300 for providing firewall fault-tolerance, in accordance with one embodiment of the present invention. Network 300 is similar in topography to network 200 (FIG. 2), except that network 300 includes a flowswitch 302 instead of shared media 204 (FIG. 2) of network 200.

In particular, network 300 includes two firewalls 202 and 104 respectively connected to network backbone 102 through interfaces 203 and 105. Firewalls 202 and 104 are also connected to flowswitch 302 through interfaces 206 and 208, respectively. Firewalls 202 and 104 can be of any suitable type of firewall available from any vendor. In this embodiment, firewalls 202 and 104 are configured to support the TCP/IP communication protocol. Also, firewalls 202 and 104 are configured in the manner standard for the particular firewall models to provide symmetrical network routing for all routes from the servers to clients (i.e., the firewalls both have all the routes for all known clients). In this embodiment, this symmetry is implemented and maintained by providing a link between firewalls 202 and 104.

Network 300 also includes two servers 106 and 108 respectively connected to flowswitch 302 through interfaces 210 and 302. In this embodiment, servers 106 and 108 are configured to have default firewalls (i.e., dynamic routing in the servers is disabled) in the standard manner for the particular server models. Similarly, the servers can be of any suitable type, vendor, or model that supports TCP/IP and is interoperable with firewalls 202 and 104.

In addition, although two firewalls and two servers are shown in this embodiment, other embodiments may use more than two firewalls and/or a different number of servers and/or different server configurations. For example, a network may have a single physical server that implements several "clusters," with each cluster having a separate server IP address.

In one embodiment, flowswitch 302 is a configurable switch circuit using a single processor connected to four Fast Ethernet Controllers through a PCI Local Bus, as described in co-filed and commonly assigned U.S. patent application Ser. No. 08/994,709 entitled "Cross Platform Server Clustering Using A Network Flowswitch", by Sajit Bhaskaran, which is incorporated herein by reference in its entirety. Accordingly, the aforementioned Ser. No. 08/994,709 application should be referred to for a more detailed description of flowswitch 302. In this embodiment, flowswitch 302 is programmed with software or firmware to provide a firewall fault-tolerant functionality.

In other embodiments, other suitable configurable switch circuits can be used, such as, for example, a configurable switch circuit using a crossbar switch. Unlike schemes that use shared media to connect the servers and firewalls, flowswitch 302 allows for full-duplex traffic between more than one pair of server/firewall connections simultaneously.

Figure 4:
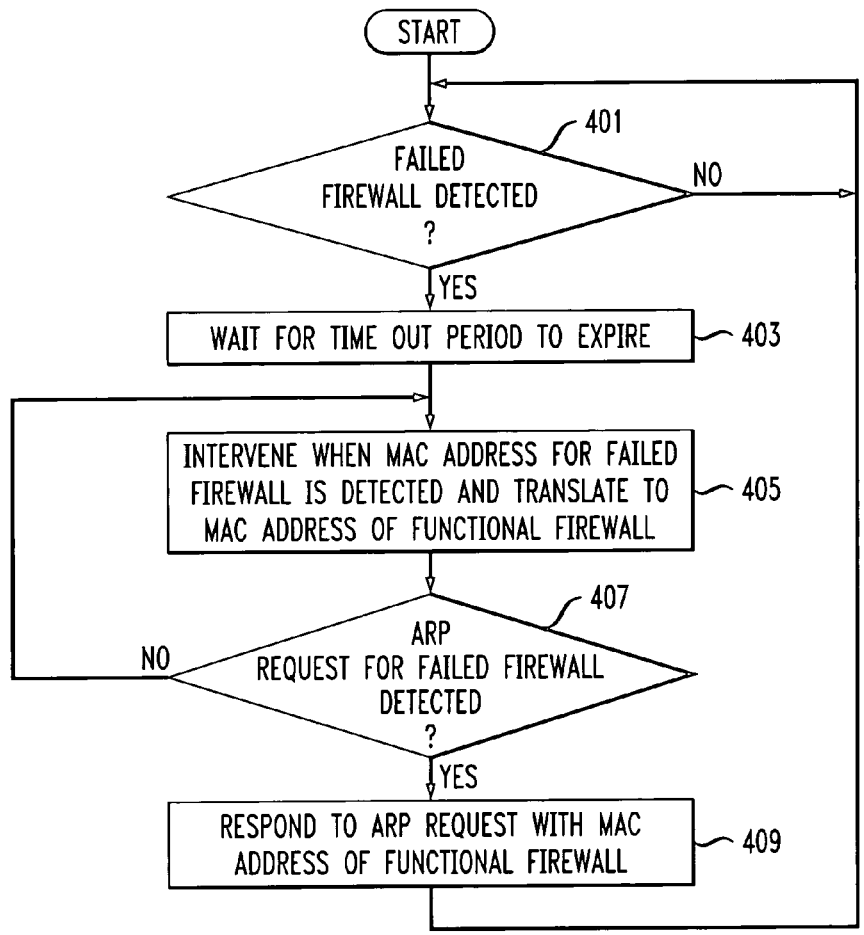
FIG. 4 is a flow diagram illustrative of the operation of the switch circuit of FIG. 3 when a firewall failure occurs, in accordance with one embodiment of the present invention.

FIG. 4 is a flow diagram illustrative of the operation of flowswitch 302 (FIG. 3) when a firewall failure occurs, in accordance with one embodiment of the present invention. Referring to FIGS. 3 and 4, network 300 operates as follows to implement a firewall fault-tolerance function.

In a step 401, flowswitch 302 monitors the status of firewalls 202 and 104. In one embodiment, flowswitch 302 is configured to probe firewalls 202 and 104 at user-configured predetermined intervals using the standard ARP Request feature of the TCP/IP to check whether the firewalls are functioning. Firewalls that support TCP/IP typically also support this ARP request feature. In this embodiment, flowswitch 302 detects that a firewall has failed when the firewall fails a user-configured predetermined number (e.g., three) of consecutive ARP requests. Similarly, flowswitch 302 detects that a failed firewall has recovered when a firewall correctly responds to a user-configured predetermined number of consecutive ARP requests (described below in conjunction with FIG. 5). The firewall status is "pending" when a firewall fails a single ARP request (and is "failed" if the firewall fails the next two ARP requests).

In an alternative embodiment, flowswitch 302 is configured to "ping" firewalls 202 and 104 at predetermined intervals using the standard ICMP Echo Request feature of the TCP/IP to check whether the firewalls are functioning.

Currently-available firewalls that support TCP/IP typically also support the ICMP echo-request feature. As in the previously-described embodiment, flowswitch 302 detects that a firewall has failed when the firewall fails a user-configured predetermined number of consecutive pings. Similarly, flowswitch 302 detects that a failed firewall has recovered when a firewall correctly responds to a user-configured predetermined number of consecutive pings. The firewall status is "pending" when a firewall fails a single ping (and is "failed" if the firewall fails the next two pings).

If no failed firewall is detected, flowswitch 302 loops back to perform step 401 to monitor the status of firewalls 202 and 104 (e.g., by waiting for the ARP responses after sending ARP Requests, etc.). However, if a failed firewall is detected, flowswitch 302 performs a step 405.

In step 405, flowswitch 302 monitors outbound traffic from the servers to the failed firewall. Flowswitch 302 then switches to a functional firewall all outbound traffic that was originally directed to the failed firewall. In particular for this embodiment, flowswitch 302 effects this switchover by intervening. As used herein in this context, intervening refers to monitoring the outbound packet traffic to detect packets having the MAC address of the failed firewall and then translating the MAC address of the failed firewall to the MAC address of a functional firewall. Thus, for example, if flowswitch 302 detects a packet from serer 106 with the MAC address of the failed firewall (say, firewall 202 in this example), flowswitch 302 translates or rewrites the MAC address of failed firewall 202 to the MAC address of functioning firewall 104 before relaying the packet to firewall 104.

Further, in accordance with the present invention, the users are to always configure the firewalls to automatically learn routes to all known clients. Consequently, because firewalls 202 and 104 have routes to all known clients, firewall 104 can properly send the packet to the addressed client. Flowswitch 302 then provides a high-bandwidth full-duplex connection between the server 106 and firewall 104 as described in the aforementioned application Ser. No. 08/994,709. Of course, the traffic from the two servers 106 and 108 is now directed to the single firewall 104, resulting in a degraded total bandwidth of network 300. However, the degraded bandwidth still supports full-duplex, which in effect provides greater bandwidth than the aforementioned conventional schemes that use a shared medium.

In a step 407, flowswitch 302 monitors the outbound traffic for address resolution protocol (ARP) requests sent by servers 106 and 108 to the failed firewall. If no ARP request for the failed firewall is detected, and assuming the failed firewall has not recovered, flowswitch 302 loops back to the step 405. Thus, if the duration of the failure to this point is less than the ARP cache timers in the servers, flowswitch 302 must continue to intervene and translate for the failed firewall.

However, when an ARP request for the failed firewall is detected, flowswitch 302 proxies the ARP request for the failed firewall, at step 409. More specifically, flowswitch 302 replies to the ARP request from the servers using the MAC address of the functional firewall instead of the MAC address of the failed firewall. As a result, the servers will send any subsequent packets to the functional firewall without any additional intervention from flowswitch 302 (i.e., in the standard manner described in the aforementioned application Ser. No. 08/994,709). The switchover to the functional firewall is transparent and non-intrusive to servers 106 and 108. Flowswitch 302 then returns to step 401. As long as the failed firewall remains in a failed condition, flowswitch 302 will continue to proxy subsequent ARP requests in this manner for the failed firewall. This feature reduces the processing burden on flowswitch 302.

Figure 5:
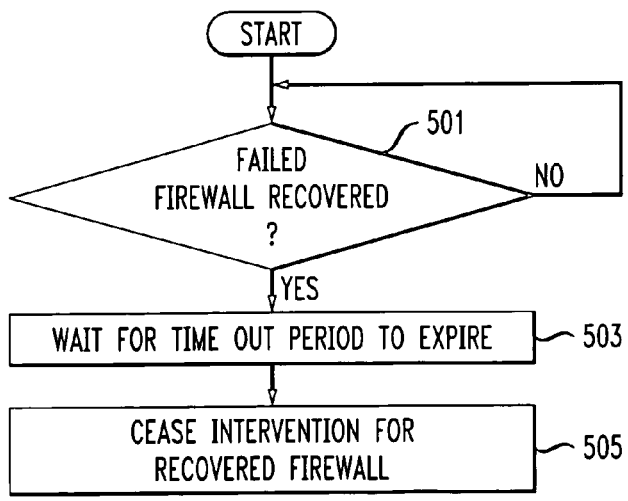
FIG. 5 is a flow diagram illustrative of the switch circuit of FIG. 3 when a failed firewall recovers, in accordance with one embodiment of the present invention.

FIG. 5 is a flow diagram illustrative of the operation of flowswitch 302 (FIG. 3) when a failed firewall recovers, in accordance with one embodiment of the present invention. Referring to FIGS. 3 and 5, flowswitch 302 operates as follows to implement a firewall-recovery function.

In a step 501, flowswitch 302 monitors the firewall traffic to detect whether a failed firewall has recovered. For example, when firewalls 104 and 202 support ARP and ping, a newly-recovered firewall will again begin responding to the ARP requests and/or ICMP echo requests. Thus, a newly-recovered firewall is detected when flowswitch 302 detects responses from the "failed" firewall. When a "failed" firewall properly replies to an ARP request or ICMP echo request, flowswitch 302 changes the status of the firewall to "pending". Then if this firewall properly responds to a user-configured predetermined number of consecutive probes or pings (e.g., three), flowswitch 302 changes the status of the firewall to "good" or functional.

After a recovered firewall is detected, in a step 501, flowswitch 302 is configured to wait for a MIN-RECOVER-TIME period to expire, at step 503, before ending the intervention and translation for the newly-recovered firewall. This time-out period allows the recovered firewall to learn all of the routes in the network and allows the external firewalls to resynchronize their routing databases before traffic is switched-over to the recovered firewall. The MIN-RECOVER-TIME period can range from one second to several seconds, depending on the firewall network topology and design. In this manner, flowswitch 302 allows for a smooth, non-intrusive transition to the restored multi-firewall configuration.

Then, in a step 505, flowswitch 302 ceases to intervene and translate the MAC addresses for the newly-recovered firewall. If the recover occurs before an ARP request updates the firewall MAC addresses in the servers, the servers still have the MAC address of the recovered firewall. Consequently, outbound traffic directed to the recovered server will automatically be properly routed to the recovered firewall. However, if the recovery occurs after the firewall MAC addresses have been updated through an ARP request, then the servers have the MAC address of the other firewall instead of the recovered firewall. In this case, outbound traffic will continue to be directed to the other firewall until a next ARP request occurs, when will update or refresh the servers with the MAC address of the recovered firewall. Subsequent outbound traffic will then be directed to the recovered firewall in the normal manner.

Alternatively, when the recovery occurs after the firewall MAC addresses have been refreshed, the switch circuit may be configured to cease intervention after a subsequent ARP request causes all of the servers to be refreshed with the MAC address of the recovered firewall.

Table 1 below lists pseudocode implementing the flow diagram of FIG. 5, according to one embodiment of the present invention.

TABLE 1

Firewall Fault Tolerance (FFT)

Figure 11A:
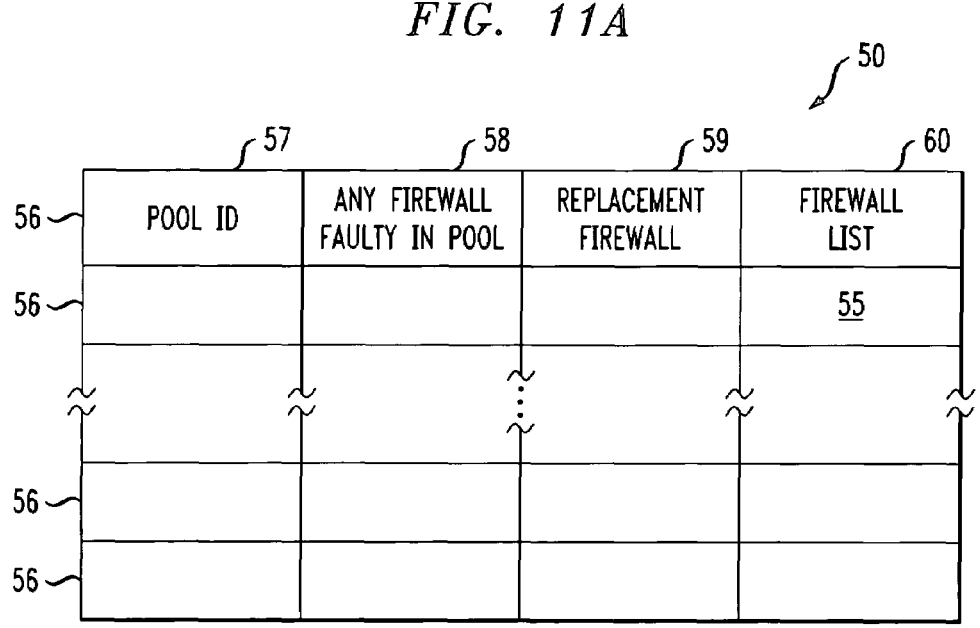
FIGS. 11A and 11B illustrate data structures used in a layer-2 switch of the type illustrated in FIG. 9A.
Figure 11B:
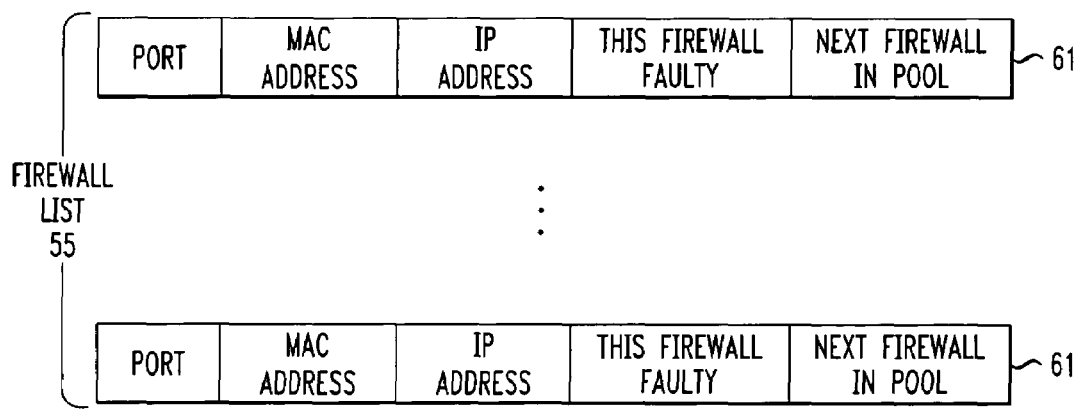

```
firewall_isOperUp (firewall f0)
{
    if (f0->state is operationally up) /* see "This Firewall Faulty" field in FIG. 11B */
        return TRUE
    else
        return FALSE
}
firewall_isOperDown (firewall f0)
{
    if (f0->state is operationally down)
        return TRUE
    else
        return FALSE
}
/* A firewall that was up went down */
firewall_setOperDown (firewall f0))
{
    if (firewall_isOperDown (f0))
        return
    if (f0->pool)
    {
        /* f0 is NOT in any firewall pool */
        return
    }
    set f0 operationally down
    if (f0->pool->backup EQUAL rO /*see "Replacement Firewall" field in FIG. 11A */
    {
        /* Backup firewall for pool went down */
        set f0->pool->backup to NONE
    }
    if (f0->pool->backup is NONE)
    {
        /* NO backup firewall selected.
        Select backup firewall now. */
        set f0->pool->backup to first
        operationally up firewall in pool
    }
    if (f0->pool->backup is NONE)
    {
        /* Failed to find an operational firewall to backup pool.
        * We have a pool with ALL firewalls down.
        */
        set rO->pool->need_forward to TRUE
        */see "Any Firewall Faulty in Pool" in FIG. 11B */
        /* Stop intervening in packet forwarding
        as we have no
        * firewall to forward to.
        */
        for (each firewall rl in f0->pool)
        {
            Configure switch to forward packets
            destined to rl MAC
            /* see "MAC Address" field in node 55 in FIG. 11B */
            Address to port rl->link
            /*see "port" field in node 55 in FIG. 11B */
        }
    }
    else
    {
        /* Backup firewall selected. */
        Configure switch to forward packets destined
        to f0 MAC Address to CPU
    }
}
/* A firewall that was down went up */
firewall_setOperUp (firewall f0)
{
    if (firewall_isOperUp (f0))
        return
    if (f0->pool is NONE)
        return
    set f0 operationally up
Configure switch to forward packets destined to f0 MAC Address to
port f0->link
    if (f0->pool->need_forward is TRUE)
    {
        set f0->pool->forward to f0
```

TABLE 1-continued

Firewall Fault Tolerance (FFT)

```
            for (each firewall rl in f0->pool)
            {
                /* Backup firewall now available. */
                if (rl NOT EQUAL f0)
                {
                    Configure switch to forward packets
                    destined to rl MAC Address to CPU
                }
            }
            set f0->pool->need_forward to FALSE
        }
        else if (there are NO operationally down
        firewalls in f0->pool)
        {
            set f0->pool->forward to NONE
        }
}
/* Firewall liveness determination */
Periodically do
{
    for (all pools that are configured)
    {
        for (each firewall f0 in pool)
        {
        if (detect method is ARP)
            {
                if (ARP Request counter GREATER
                THAN bring down value))
                (
                    firewall-setOperDown (f0)
                }
                Send ARP Request to f0->link
                Increment ARP Request counter for f0
            }
        else if (detect method is ICMP echo)
            {
                if (ICMP echo Request counter GREATER
                THAN bring down value))
                (
                    firewall-setOperDown (f0)
                }
                Send ICMP echo Request to f0->link
                Increment ICMP echo Request counter for f0
            }
        }
    }
}
for (each ARP Reply packet)
{
    if (reply is from firewall f0))
    {
        if (firewall_isOperDown (f0))
        (
            Increment ARP Reply counter for f0
            If (ARP Reply counter GREATER THAN
            bring up value)
            {
                set ARP Reply counter for f0
                to 0 (Zero)
                firewall_setOperUp (f0)
            }
        }
        Set ARP Request counter for f0 to 0 (Zero)
    }
}
```

Table 2 below lists pseudocode implementing the flow diagram of FIG. 6, according to one embodiment of the present invention.

Figure 6:
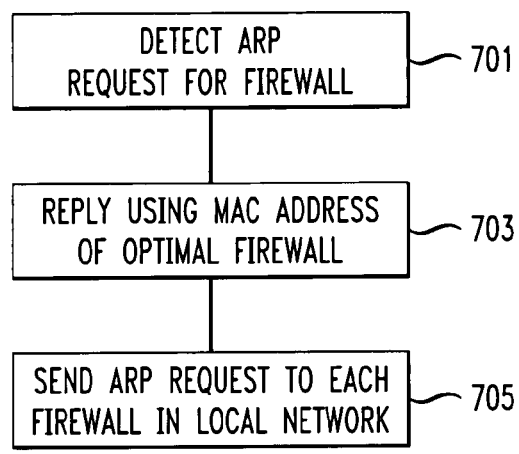
FIG. 6 is a flow diagram illustrative of the operation of the switch circuit of FIG. 3 to perform proxy ARP for fault-tolerance of firewalls in accordance with one embodiment of the present invention.

FIG. 6 is a flow diagram illustrative of the operation of the switch circuit 302 of FIG. 3 to perform proxy ARP for fault-tolerance of firewalls. Upon detecting an ARP request for a firewall, at step 701, switch circuit 302 replies thereto by using the MAC address of an optimal firewall, at step 703, and sends an ARP request to each firewall in the local network, at step 705.

Table 2 lists pseudocode implementing the flow diagram of FIG. 6 according to one embodiment of the present invention.

TABLE 2

Proxy ARP for Firewall Fault Tolerance (FFT)

```
for (each ARP Request packet)
{
    if ((ARP Request target IP Address is for
    firewall r0) AND (f0->pool is NOT NONE))
    {
        /* ARP for a firewall that is in a firewall
        pool*/
        if ((firewall_isOperDown (f0)) AND
            (f0->pool->forward is NOT NONE)
        {
            Set ARP Reply Source IP Address as f0
            IP Address
            Set ARP Reply Source MAC Address as
            f0->pool->forward MAC Address
            send ARP Reply packet on link that the
            request was received
        }
        if (firewall_isOperUp (f0))
        (
            /* Select a firewall to use*/
            select r1 that is functional
            based on searching through the pool
            Set ARP Reply Source IP Address as f0 IP
            Address
            Set ARP Reply Source MAC Address
            as r1 MAC Address
            send ARP Reply packet
            on link that the request was received
        }
        return
    )
    Perform normal Proxy ARP function
}
Packet Forwarding for FFT for (each IP Packet)
{
    /* Is FFT Algorithm needed? */
    set r0 to spdb_getFirewallByMACAddress
    (packet destination address)
    if ((f0 is NOT NONE) AND
        (f0->pool is NOT NONE) AND
        (f0->pool-> forward is NOT NONE))
    {
        /* Do FFT stuff*/
        set packet destination MAC Address
        to f0->pool->forward MAC Address
        send packet to port f0->pool->forward->link
        return
    }
    /* NO special handling needed */
    Perform normal packet forwarding. */
}
```

Figure 7:
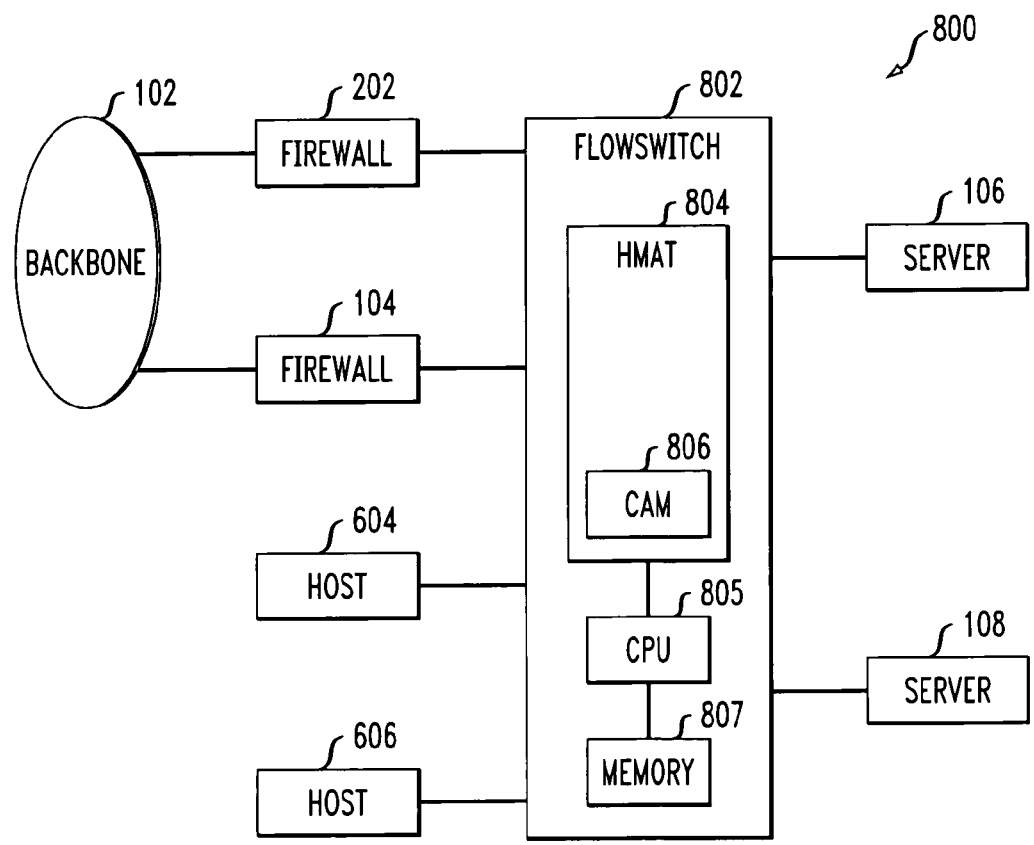
FIG. 7 is a block diagram of a network having a switch circuit with a hardware MAC address translator, in accordance with one embodiment of the present invention.

FIG. 7 is a block diagram of network 800 having a flowswitch 802 with a hardware MAC address translator (HMAT) 804, according to one embodiment of the present invention. Network 800 is substantially similar to network 300 (FIG. 3), except that network 800 includes flowswitch 802 instead of flowswitch 302 as in network 300. In this embodiment, flowswitch 802 is implemented as described in the aforementioned application Ser. No. 08/994,709, with the addition of HMAT 804. HMAT 804 can be implemented with an associative memory 806 such as, for example, a content-addressable memory (CAM). Flowswitch 802 also includes, in this embodiment, a CPU 805 and attached thereto a memory (such as DRAM) 807.

In one implementation, CPU 805 is, e.g., IDT R5000 RISC processor operating at a frequency of, e.g., 225 MHz, and memory 807 is, e.g., 64 MB. HMAT 804 of this implementation is an ASIC made by, e.g., Galelio Technology, and performs layer-2 switching of packets between all ports of flowswitch 802. Note that, although one example of circuitry has been illustrated for the hardware, other circuitry that performs layer-2 switching can also be used. Moreover, the software described herein and in the attached Appendix can be used with any hardware other than the example described above.

Figure 8A:
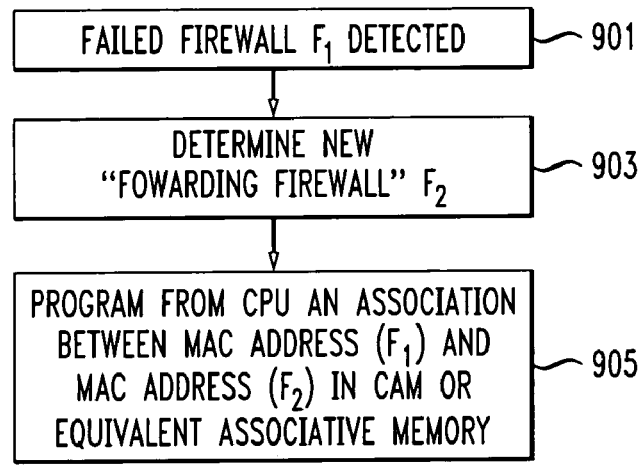
FIGS. 8A and 8B are flow diagrams illustrative of the operation of the switch circuit of FIG. 7 in translating a MAC address, in accordance with one embodiment of the present invention.
Figure 8B:
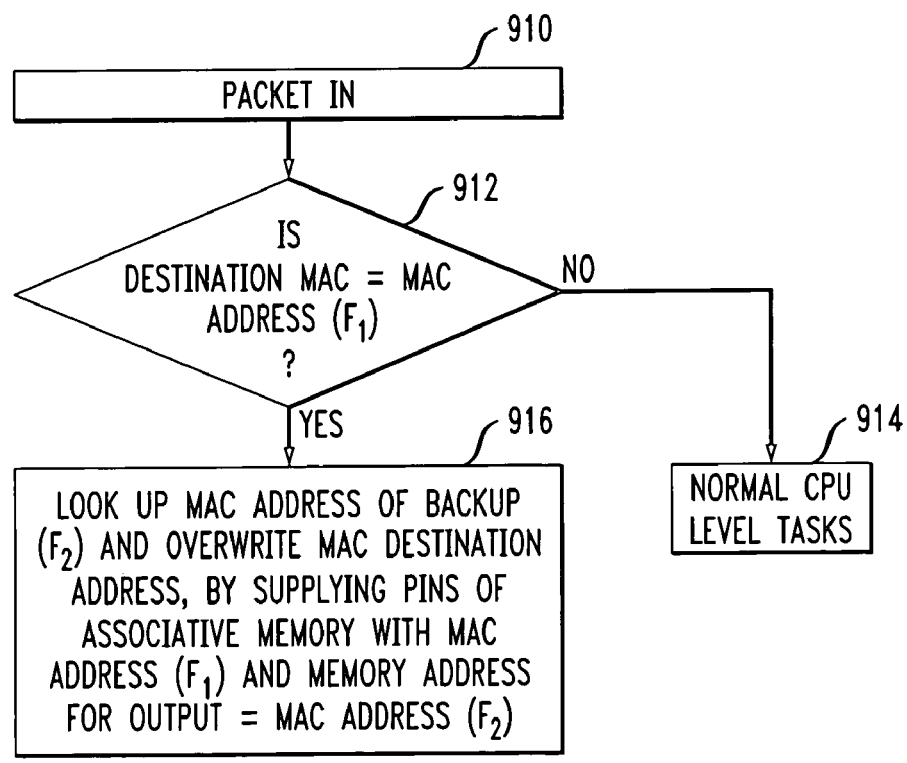

FIGS. 8A and 8B are flow diagrams illustrative of the operation of HMAT 804. Referring to FIGS. 7 and 8A, associative memory 806 is programmed as follows. In a step 901, flowswitch 802 detects a failed firewall as described above in conjunction with FIG. 4. In a next step 903, flowswitch 802 selects a new functional firewall to which outgoing traffic directed to the failed firewall is to be redirected, as described above in conjunction with FIG. 4. In a next step 905, flowswitch 802 programs associative memory 806 to store to the MAC address of the selected functional firewall in association with the MAC address of the failed firewall. Consequently, as is well known in the art of associative memories, associative memory 806 will output the MAC address of the selected functional firewall when accessed using the address of the failed firewall.

Referring to FIGS. 7 and 8B, flowswitch 802 redirects outgoing traffic (i.e., from servers 106 or 108 or hosts 604 or 606) originally intended for the failed firewall to the selected functional firewall as follows. In a step 910, flowswitch 802 receives a packet from servers 106 or 108 or hosts 604 or 606.

In a next step 912, the MAC address contained in the received packet is received on the address lines (not shown) of associative memory 806. If the received MAC address does not match the MAC address of the failed firewall (which is stored in associative memory 806), flowswitch 802 performs a step 914 in which the output address of associative memory 806 is disregarded and flowswitch 802 performs the normal tasks in directing the packet to the intended firewall as described in the aforementioned application Ser. No. 08/994,709.

However, if the received MAC address does match the MAC address of the failed firewall, in a step 916 associative memory 806 outputs the MAC address of the selected functional firewall. The MAC address of the received packet (i.e., of the failed firewall) is then overwritten with the MAC address provided by associative memory 806 (i.e., of the selected functional firewall), resulting in the packet being forwarded to the selected functional firewall instead of the failed firewall. Because associative memory 806 is used in flowswitch 802, the MAC address translation is performed significantly faster than a typical software MAC address translation. In addition, the processor in flowswitch 802 is freed to perform other tasks while the hardware is performing the MAC address translation.

Figure 9B:
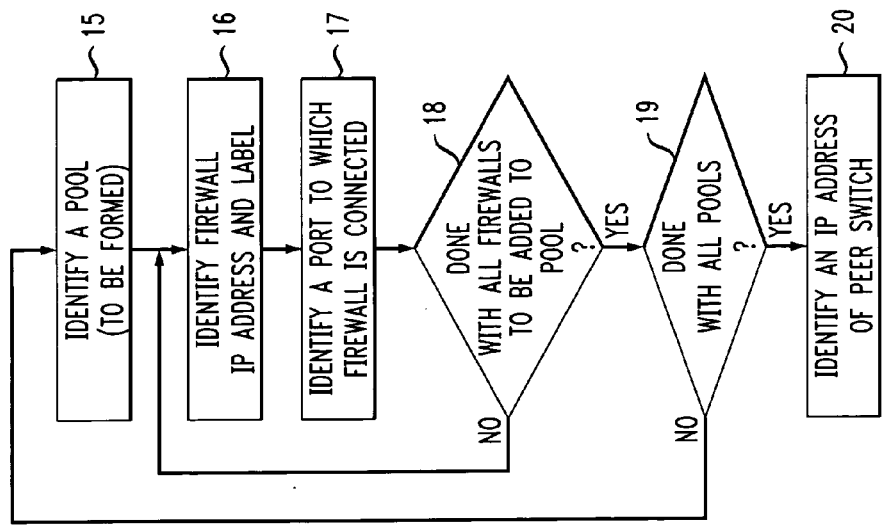
FIG. 9B illustrates, in a flow chart, acts performed in one embodiment to configure the items illustrated in FIG. 9A.
Figure 9A:
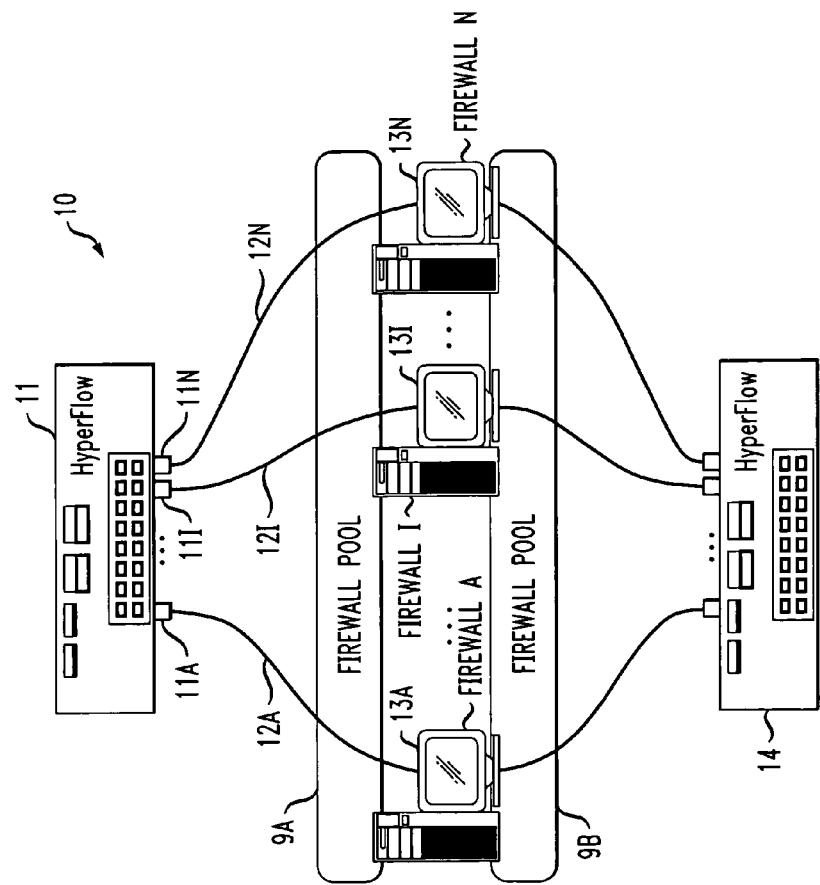
FIG. 9A illustrates, in a high-level block diagram, two layer-2 switches that are individually coupled to a number of the firewalls in one embodiment of the invention.

A switch 11 (FIG. 9A) in one embodiment of the invention has a number of ports 11A–11N (where A<I<N), and one or more of these ports is coupled to one or more firewalls by buses 12A–12N, e.g., firewalls 13A–13N. Similarly, another switch 14 is also coupled to one or more of firewalls 13A–13N. Firewalls 13A–13N can be of any suitable type of firewall available from any vendor. In this embodiment, firewalls 13A–13N are configured to support the TCP/IP communication protocol. Also, firewalls 13A–13N are configured in the manner standard for the particular firewall models to provide symmetrical network routing for all routes from the servers to clients (i.e., the firewalls all have all of the routes for all known clients).

Note that couplings 12A–12N do not form a shared medium, and therefore they operate independently of other devices in network 10. In one implementation, connections 12A–12N are 10/100 Ethernet connections.

To create a pool 9A of two or more firewalls, a person first identifies to switch 11 a pool to be formed therein (e.g., in step 15 illustrated in FIG. 9B), e.g., provides a number as a label for the pool. Then (e.g., in step 16) the person identifies a firewall (e.g., firewall 13I) by providing an IP address and a label. Next, the person identifies a port (e.g., in step 17), e.g., port 11I of switch 11 to which the firewall is coupled. In this embodiment, switch 11 changes a type field for the port to the value "firewall port". If any more firewalls are to be added to the pool 9A that was just described, as determined at step 18, the person returns to step 16. If all firewalls have been added for this pool, the user may perform the above-described process to add more pools to switch 11. Once all pools have been configured, as determined at step 19, the user identifies an IP address of switch 14 as a "peer" switch (which is a switch that responds to a probe message such as an ICMP echo, and the response message is sent on the same port on which the request message is received), at step 20. Moreover, the above-described process is repeated with switch 14, to form the pool 9B in switch 14. Note that if the firewalls being configured maintain session information (such as proxy servers or NAT devices as opposed to pure packet filters), then the order of addition of the firewalls and the ports to the pool in switch 14 should be identical to the corresponding order in switch 11.

Figure 9C:
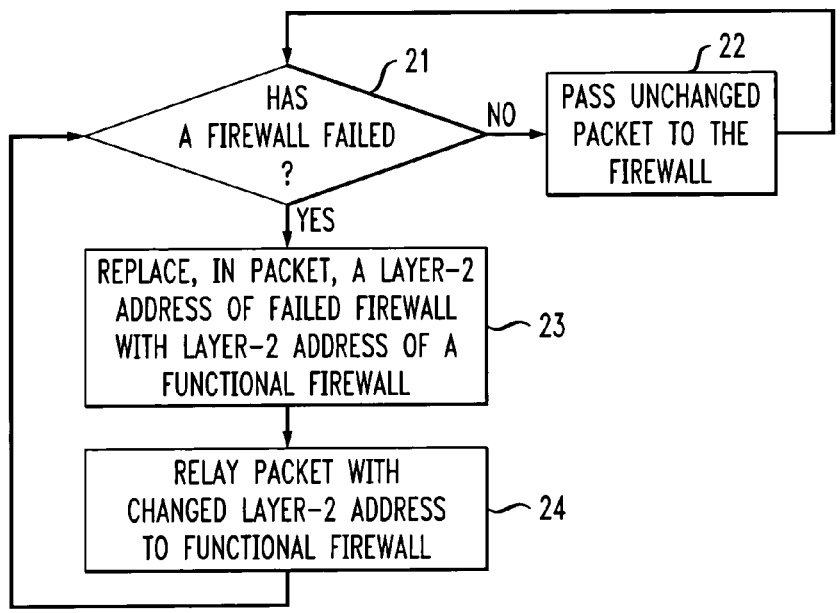
FIGS. 9C–9E illustrate, in flow charts, acts performed in a layer-2 switch of the type illustrated in FIG. 9A.

During operation, each of switches 11 and 14 checks (see step 21 in FIG. 9C) if any firewall that is connected thereto has failed. If there is no failure, switches 11 and 14 pass the packets intact (without any change, e.g., in the address fields) to the respective firewalls. If a firewall has failed, switch 11 replaces (see step 23 in FIG. 9C), in each packet, a layer-2 address of the failed firewall with the layer-2 address of a functional firewall. In the example illustrated in FIG. 9A, if firewall 13A fails, switch 11 may send (e.g., see step 24 in FIG. 9C) the packets to another firewall 13I (or alternatively to firewall 13N). Of course, switch 11 will confirm that firewall 13I is functional before sending traffic thereto.

Figure 9D:
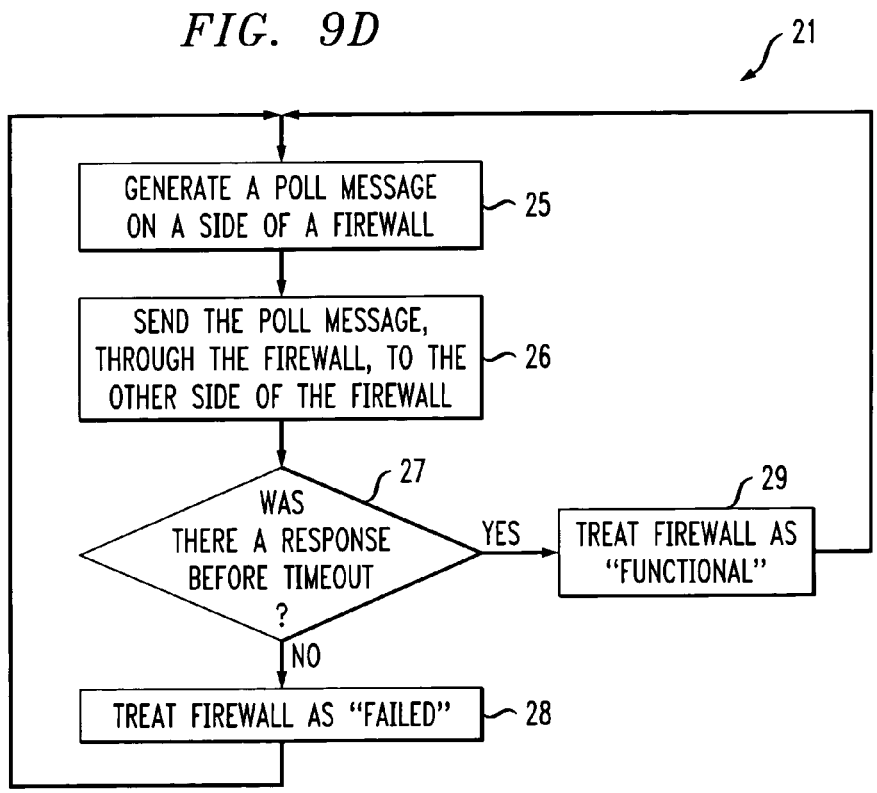

In one embodiment, switch 11 determines the state of each firewall attached thereto as illustrated by a method 21 (FIG. 9D). Specifically, switch 11 generates on one side of the firewall a request message (e.g., using the standard ICMP Echo Request feature of the TCP/IP), as illustrated by step 25. Switch 11 sends the request message through the firewall to the other side, as illustrated by step 26. Next, switch 11 checks if there is a response to the request message, at step 27. If there is no response during passage of a predetermined time period (e.g., 10 seconds), switch 11 determines that the firewall has failed (e.g., see step 28). If a response is received prior to the predetermined time period, the firewall is treated as "functional" (i.e., available to carry traffic) as illustrated by step 29 in FIG. 9D.

Figure 9E:
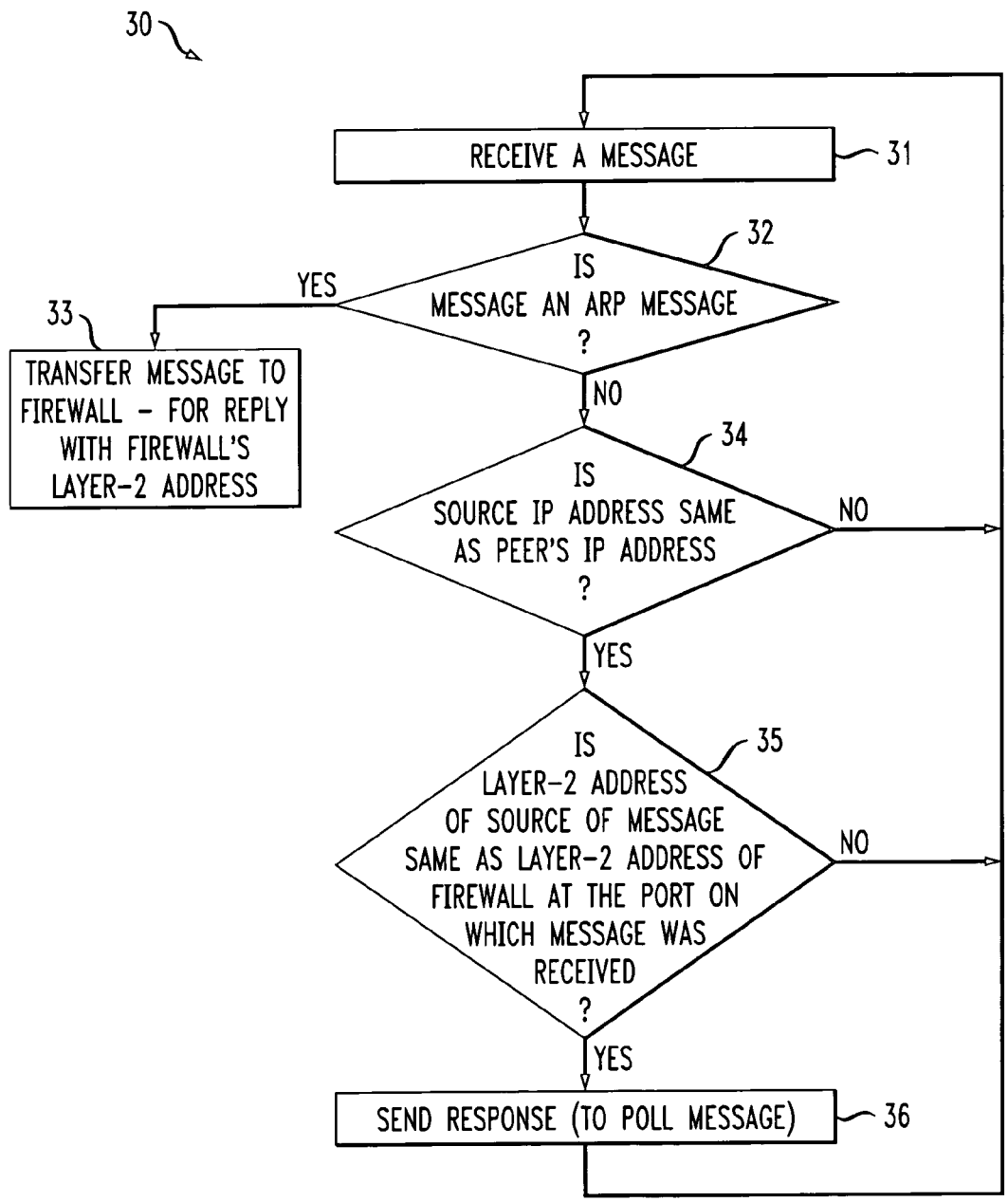

On the other side of firewalls 13A–13N, switch 14 receives the request message sent by switch 11, in step 31 (FIG. 9E). Next, switch 14 checks if the message received is an ARP message, at step 32, and if so, goes to step 33 where the message is transferred to the addressed firewall, so that a reply having the firewall's layer-2 address as the source address can be generated and sent back. If the received message is not an ARP message, as determined at step 32, switch 14 checks, at step 34, if the source IP address (i.e., the layer-3 address) in the request message is same as the IP address that had been configured as described above (see step 20 in FIG. 9B). If not, switch 14 simply drops the message and returns to step 31 to receive another message. However, if in step 34 the condition is satisfied, switch 14 checks, at step 35, if the layer-2 address in the request message is same as the layer-2 address of a firewall at the port on which the message was received. If not, switch 14 returns to step 31; if so, switch 14 simply sends (e.g., in step 36) a response back on the same port over which the request message was received. Sending a response on the same port ensures that the functional status for a firewall coupled to the port in all the peer switches is the same.

If firewalls 13A–13N are configured to perform Network Address Translation (NAT), then a rule is added to firewalls 13A–13N to create a "hole" to allow the request message to passes therethrough. Specifically, the rule causes the firewalls 13A–13N to maintain unchanged the internet protocol (IP) address of a source of the request message.

Figure 9F:
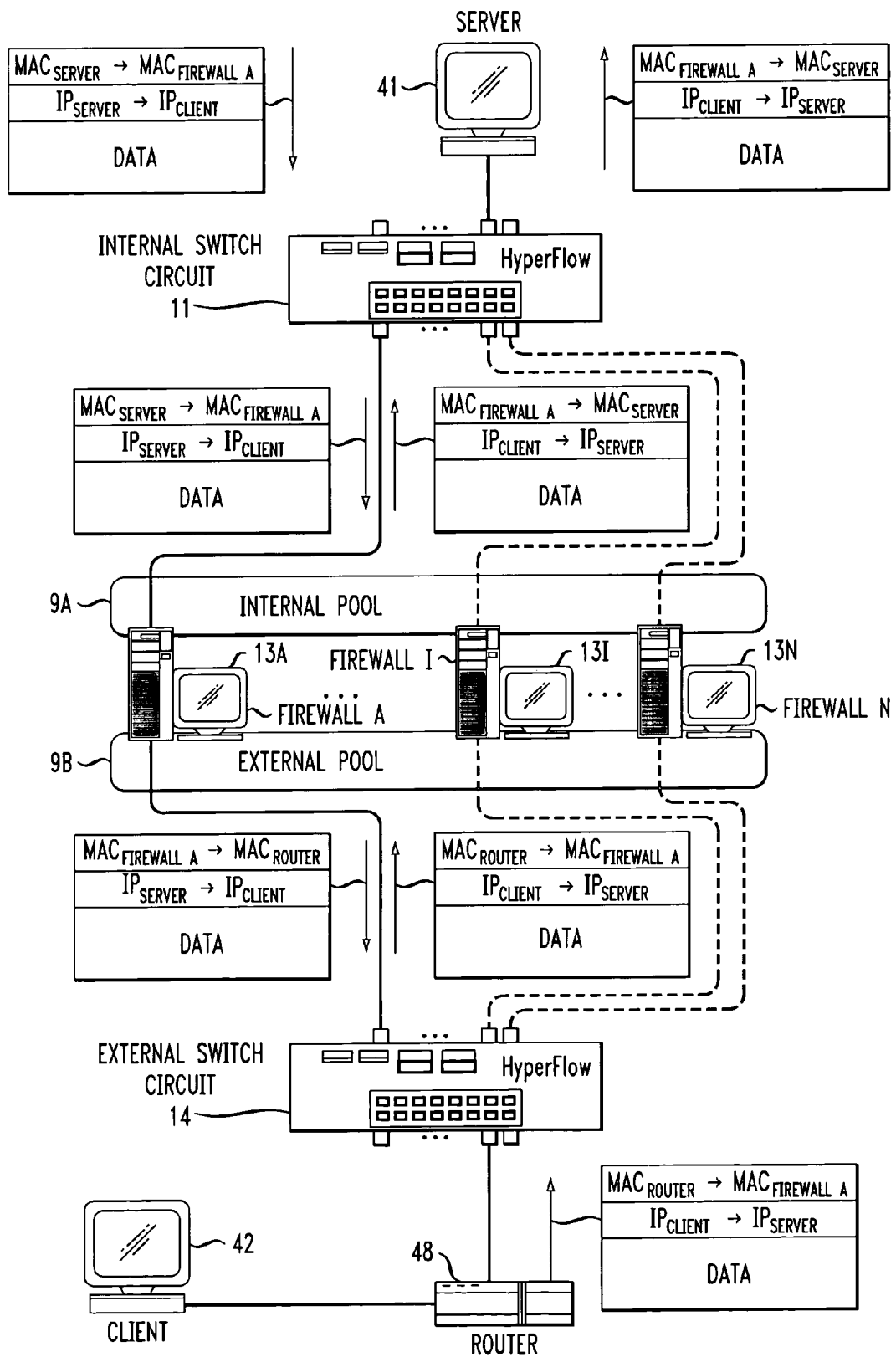
FIGS. 9F and 9G illustrate the flow of traffic and changes to layer-2 addresses in the packets from end to end.

In one embodiment, a server 41 (FIG. 9F) and a client 42 communicate with each other in the normal manner via firewalls 13A–13N (regardless of the presence or absence of switches 11 and 14). For example, server 41 may send a packet having as destination addresses the MAC address of a first firewall (e.g., firewall 13A) and the IP address of the client. On receipt of such a packet, switch 11 simply transfers the packet to firewall 13A, without any changes whatsoever to the packet. Firewall 13A inserts the MAC address of the first firewall as the source MAC address of the packet. Firewall 13A also inserts the MAC address of the router 48 as the destination address, and then transmits the packet to switch 14 (which in turn transmits the packet—again unchanged—to the client via the router). A similar set of acts are performed for transferring a packet in the reverse direction.

Figure 9G:
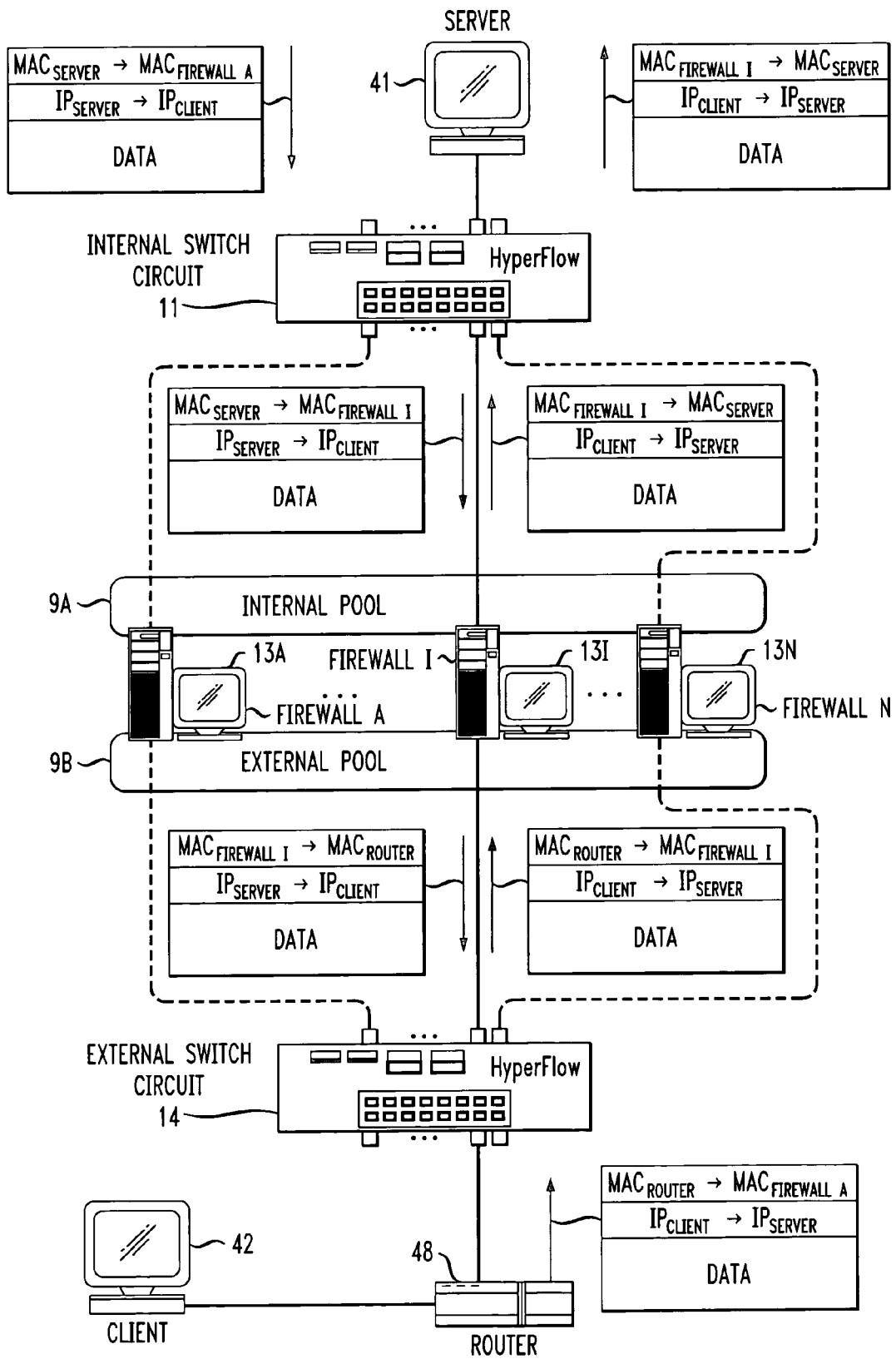

When switch 11 (FIG. 9G) detects a failure of firewall 13A, switch 11 replaces the destination MAC address in the packet (which is the address of firewall 13A), with the MAC address of another firewall 13I. In a similar manner, switch 14 also replaces the destination MAC address in the packet (which is the address of firewall 13A) with the MAC address of firewall 13I. In one implementation, a linear search from the beginning of the list for the pool is used to select the replacement firewall, so that the same firewall is selected by both switches 11 and 14 (because the functional status of the firewalls is the same in both switches 11 and 14 due to the probing of peer switches through the firewalls—e.g., if switch 11 treats a firewall to be down, then switch 14 also treats this same firewall to be down).

Figure 10:
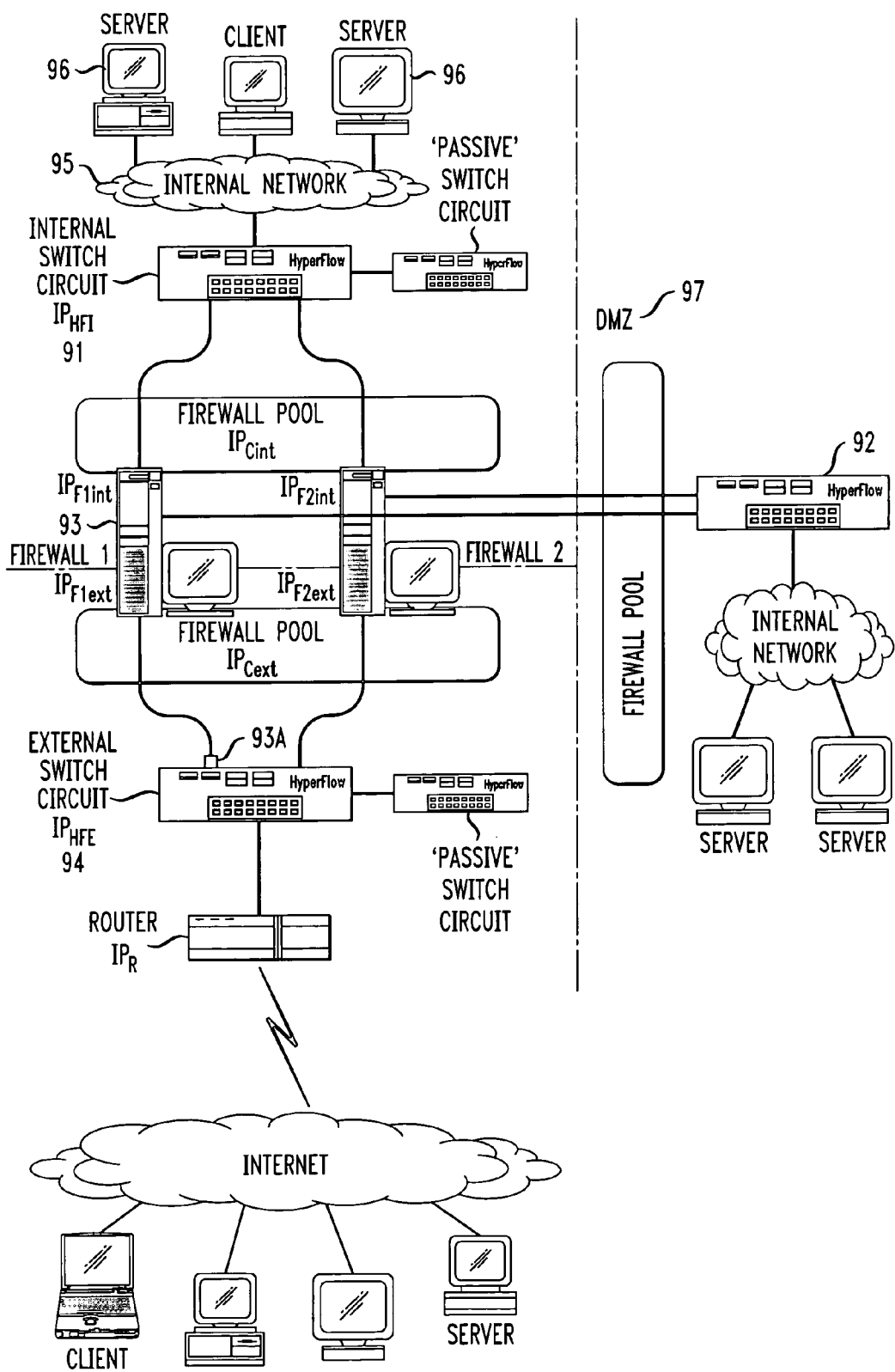
FIG. 10 illustrates an implementation of pooling of firewalls that each have more than two interfaces.

Note that the above-described arrangement of switches and firewalls can be used in any application, as would be apparent to the skilled artisan. For example, in FIG. 10, switch 91 is coupled to an internal network 95 instead of being coupled directly to one or more server computers 96. Furthermore, the firewalls can be used to set up a data management zone (DMZ) 97 (also illustrated in FIG. 10).

Also, each switch 91 and 94 can have more than one pool.

In one embodiment, when a DMZ zone 97 is set up, each switch has two peers. For example, switch 91 in FIG. 10 has switches 92 and 94 as peers. Switch 91 treats each firewall in the pool (e.g., firewall 93) as functional when probes to each of peers 92 and 94 are successful (i.e., two request messages are sent on port 93A, and two reply messages are received from port 93A). If any reply message is not received, then firewall 93 is treated as failed.

In one embodiment, a switch 11 (FIG. 9A) includes a memory (not shown) that holds numerous bits of information, including, for example, a table 50 illustrated in FIG. 11A. Each row 56 in table 50 corresponds to one pool. In this embodiment, the table 50 has a number of fields 57–60, including a pool identifier 57 that uniquely identifies a pool of firewalls. The table holds information 58 on whether or not a firewall in a pool indicated by the pool identifier is currently faulty. If a firewall is faulty, the table also holds a replacement firewall 59 as another field, so that a packet addressed to the faulty firewall can be quickly routed to the replacement firewall. The faulty firewall, the replacement firewall and any other firewalls in the pool are held in another field 60 that contains a list of all firewalls in the pool. The list can be implemented as a linked list 55 (FIG. 11B), wherein each node 61 of the list maintains information about a firewall, such as port, MAC address, IP address, faulty flag and next firewall in the list. The data structures 50 and 55 illustrated in FIGS. 11A and 11B are used as described above in Tables 1 and 2.

In one implementation, switch 11 is implemented tin conventional hardware used for a layer-2 switch. The hardware includes ASICs that send all incoming packets to the respective firewalls identified by the destination MAC address in the packets. In one embodiment, switch 11 includes a single processor connected to four Fast Ethernet Controllers through a PCI Local Bus, as described in co-filed and commonly assigned U.S. patent application Ser. No. 08/994,709, entitled "Cross-Platform Server Clustering Using A Network Flowswitch", by Sajit Bhaskaran, filed on Dec. 19, 1997, now U.S. Pat. No. 6,266,335, which is incorporated herein by reference in its entirety. Accordingly, the aforementioned application Ser. No. 08/994,709 should be referred to for a more detailed description of switch 11.

Note that one implementation of the type described herein for firewall pooling has the following advantages. All outgoing traffic for the same client-server session is handled by the same firewall (in both the inbound and outbound direction). Moreover, unlimited client-server sessions can be supported. Also, the following failure conditions are detected by the switch: failure of firewall internal LAN interface and link, failure of the firewall external LAN interface and link, failure of the firewall itself due to power outage, software malfunction, hardware malfunction, etc. On a failure being detected, traffic is automatically forwarded to the remaining operational firewall(s) on both directions. No manual intervention is needed at the server to bypass the failed firewall. The switch operates in a manner that is independent of the firewall hardware and software.

Numerous modifications and adaptations of the embodiments described herein will be apparent to the skilled artisan in view of the disclosure. For example, in light of the present disclosure, those skilled in the art of networking can implement other embodiments of the switch circuit using a crossbar switch without undue experimentation. Specifically, in other embodiments, other suitable configurable switch circuits can be used such as, for example, a configurable switch circuit using a crossbar switch. Unlike schemes that use shared media to connect the servers and firewalls, the switches described herein allow full duplex traffic between more than one pair of firewall connections simultaneously. Further, those skilled in the art can implement other embodiments of the switch circuit for local networks having more than two servers and firewalls. Moreover, although certain functions have been described above in reference to switch 11, the same functions can be performed by switch 14.

Note that firewall pooling of the type described above can be performed in combination with (or independent of, depending on the embodiment) one or more of the following: firewall clustering and/or router clustering and/or router pooling and/or server clustering, as described in the related patent application Ser. No. 09/540,296 and Ser. No. 09/540,297, respectively, and pooling of routers as described in U.S. Pat. No. 5,963,540, all of which are incorporated by reference herein in their entirety.

A firewall clustering system connects two or more firewalls between an internal network and an external network. The plurality of two or more firewalls are combined to supply high-availability and scaling of processing capacity. Firewalls maintain client-server state information. Flow controller are connected to the firewalls and placed on both the internal "trusted" side of the external "untrusted" side of the firewalls. Flow controllers are placed on both sides of the firewalls to ensure that traffic for a given client-server session flow through the same firewall in both inbound and outbound directions. The firewalls perform filtering operations and/or network address translation (NAT) services. In both cases, the flow controllers supply high availability scalability, and traffic distribution for the firewalls in the firewall cluster.

Various implementations of the firewall clustering system have several firewall clustering features and benefits. Both inbound and outbound traffic are distributed between firewalls on both the internal and external sides of the firewalls. The flow controller distributes traffic baased on the source and destination IP addresses of a packet, ensuring that all IP-based protocols are supported.

In some embodiments, all outgoing traffic for a single client-server session are handled by the same firewall in both the inbound direction and the outbound direction. The flow controller supports unlimited client-server sessions. For communication interconnects using a firewall clustering system, servers need not be configured with multiple firewall IP addresses for a gateway. Servers are configured to use a single 'logical' firewall having an IP address identifying the internal firewall cluster.

Routers can be configured with either a single or multiple firewall IP addresses for a gateway. Routers are configured to use a single "logical" firewall having the same IP address as the external firewall cluster. In some implementations, the firewall clustering system continually monitors the operational health of the routers and associated internal and external links. In some implementations, the firewall clustering system detects one or more of various failure conditions including: (1) failure of the firewall internal LAN interface and link, (2) failure of the firewall external LAN interface and link, and (3) failure of the firewall due to power outage, software malfunction, hardware malfunction, or other condition. When the firewall clustering system detects a failure, traffic is automatically forwarded to the remaining operational firewall or firewalls in both the inbound and outbound directions. The firewall clustering system does not require manual intervention at the server to bypass the failed firewall.

The firewall clustering system supports Ping functionality and Address Resolution Protocol (ARP) for detection with data management zone (DMZ) support. A configuration of a firewall clustering system can also cluster three interfaces including external, internal, and data management zone (DMZ) regions. One flow controller is connected to each interface of the firewalls for the internal, external, and DMZ zones for a total of three flow controllers. Additional firewalls may be seamlessly added to supply additional bandwidth and greater fault-tolerance.

The firewall clustering system operates in a manner that is independent of the firewall hardware and software. Various combinations of firewalls can exist in the cluster. In one aspect of a firewall clustering system, a firewall cluster creator creates or configures a firewall cluster on both internal and external network flow controllers. To create a firewall cluster on an internal network flow controller, an administrator assigns to the cluster a logical Internet protocol (IP) address $IP_{Cint}$ and specifies firewalls, Firewall1: $IP_{F1int}$ and Firewall2:$IP_{F2int}$, that are members of the firewall cluster. The IP address of an external network flow controller ($IP_{HFE}$) is configured as a peer unit that is probed using Ping packets at a configured polling interval. If the firewalls are performing NAT then the firewall cluster zone is configured as internal.

To create a firewall cluster on an external network flow controller, the administrator assigns the cluster a logical IP address $IP_{Cext}$ and specifies firewalls, Firewall1:$IP_{F1ext}$ and Firewall2:$IP_{F2ext}$ that are members of the firewall cluster. The IP address of an internal network flow controller ($IP_{HFI}$) is configured as a peer unit that is probed using Ping packets at a configured polling interval. If the firewalls are performing NAT, then the firewall cluster zone is configured as external. The internal and external network flow controller units monitor the health of the firewalls by sending Ping packets through both the internal and the external firewalls, effectively testing the operational state of the firewall and the internal and external links.

In some implementations, the logical internal firewall cluster address $IP_{Cint}$ is configured on the servers at the site as a 'default' gateway rather than a unique IP address of one of the firewalls' internal interfaces. The logical external firewall cluster address $IP_{Cext}$ is configured on the servers at the site as a 'next-hop' gateway rather than a unique IP address of one of the firewalls external interfaces. The internal network flow controller responds to an Address Resolution Protocol (ARP) request from the servers to identify a Media Access Control (MAC) address associated with the firewall cluster $IP_{Cint}$. The external network flow controller responds to an Address Resolution Protocol (ARP) request from the servers to identify a Media Access Control (MAC) address associated with the firewall cluster $IP_{Cext}$.

In another aspect of the firewall clustering system, a traffic distributor includes internal and external network flow controller units that mutually distribute message traffic. The network flow controller units select a firewall of the plurality of firewalls in a cluster to forward the traffic based on information in the packet header. When the firewalls are only performing packet filtering, both the internal and the external network flow controller units use the source and destination IP address and port to identify the client-server flow.

When the firewalls are performing NAT the external network flow controller unit uses the packet source IP address to distribute inbound traffic for the firewall cluster. The internal network flow controller unit uses the packet destination IP address to distribute outbound traffic for the firewall cluster. For example, the IP address of a device on the Internet corresponds both to the source IP address for the external unit and the destination IP address for the internal unit. Both network flow controller units use the same packet information to determine the traffic distribution.

Internally, each of the network flow controller units maintains a list of operational firewalls. Fields from the packet are used to compute the index into the list, indicating the firewall that is to be used. To ensure that the same firewall is selected by both the internal flow controller and the external flow controller, the order of configuration of the firewalls must be the same on both network flow controller units. Thus for any given client-server connection flow, the same firewall is used by both the internal and external network flow controller units for every inbound and outbound packet, so long as the firewall remains operational. Each firewall has an equal probability of assignment for a flow for processing, since the traffic distributor uses only information in the packet IP header to select between firewalls. Processing load or potential processing power of the firewall is not analyzed in the selection.

A clustering system operates on all types of Internet protocol (all/IP) technologies and can be used to create a cluster of any Internet Servers, no matter what protocol is running on IP, even Voice over Internet protocol (VoIp) and streaming audio/video via User Datagram Protocol (UDP/IP). The clustering system avoids problems associated with NAT such as an inability to encrypt the data, because the all/IP approach allows each of the servers in the cluster to use the same IP address as the cluster's overall address. In some embodiments, the clustering system executes on local area network (LAN) switch hardware to attain very high data-throughput rates.

Unlike Switch-Based load balancers, a clustering system does not process packets flowing from servers to users, the direction of the largest data flow. Instead, the firewall clustering system operates as a wire-speed switch for downstream traffic.

Advantages of a clustering system depend on the particular implementation of the system. One advantage is that capacity of the cluster increases linearly as additional servers are added to the cluster. In various implementations, the clustering system manages all or some of the cluster activities, freeing servers in the cluster from expending computing power on cluster management. The clustering system controls connections of clients to particular servers, reducing the computing required to manage the cluster on servers in the cluster and freeing computing power to be applied to the task of the cluster. The clustering system can manage many different clusters simultaneously, allowing specific hardware to easily migrate from one cluster to another, as demand patterns dictate.

Management of a clustering system and one or more clusters is accomplished through any of several different management methods, including telnet, CLI, Web browser, and SNMP. The clustering system assists customers with an easy-to-use single point of management to control multiple clusters in multiple tiers of computing. The clustering system allows administrators to choose the management method that works best for the particular business characteristics and facility.

Figure 12:
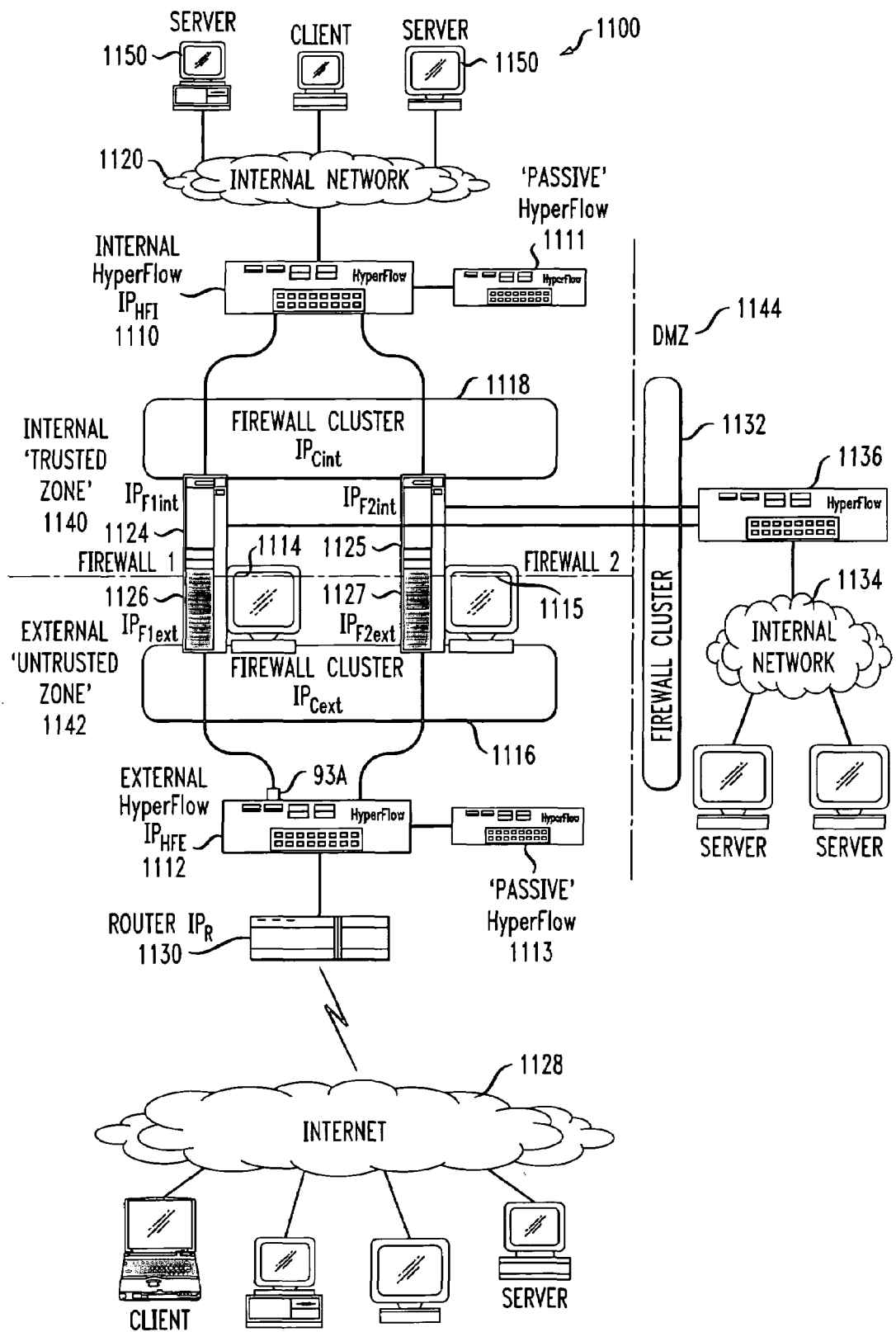
FIG. 12 is a schematic block diagram illustrating an embodiment of a firewall clustering system that connects multiple firewalls to multiple networks.

Referring to FIG. 12, a schematic block diagram illustrates an embodiment of a firewall clustering system 1100 that connects two or more firewalls to two or more distinct networks. For example Firewall1 1114 and Firewall2 1115 interconnect to two or more distinct networks such as an internal network 1120 and an external network, here the Internet 1128, in an arrangement with high-availability and scaling of processing capacity. Firewalls maintain client-server state information and protect the information from undesired transfer across the internal-external boundary.

Flow controllers are connected to the firewalls and placed on both the internal "trusted" side and the external "untrusted" side of the firewalls. A plurality of network flow controllers, for example an internal network flow controller $IP_{HFI}$ 1110 and an external network flow controller $IP_{HFE}$ 1112, manage an internal firewall cluster $IP_{Cint}$ 1118 and an external firewall cluster $IP_{Cext}$ 1116. The illustrative configuration includes optional redundant network flow controllers to ensure reliability, with the internal network flow controller $IP_{HFI}$ 1110 backed by a passive internal network flow controller 1111 and the external network flow controller $IP_{HFE}$ 1112 backed by a passive external network flow controller 1113. Redundant flow controllers avoid difficulties that arise with a single point of failure.

The internal network flow controller $IP_{HFI}$ 1110 includes a processor (not shown) and storage (not shown) that execute special-purpose software and manage an internal portion $IP_{F1int}$ 1124 of Firewall1 1114 and an internal portion $IP_{F2int}$ 1125 of Firewall2 1115. The external network flow controller $IP_{HFE}$ 1112 is typically similar to internal network flow controller $IP_{HFI}$ 1110 and manages an external portion $IP_{F1ext}$ 1126 of Firewall1 114 and an external portion $IP_{F2ext}$ 1127 of Firewall2 1115. The network flow controllers may connect to the associated network via a router. In the illustrative example, a router 1130 connects the external network flow controller $IP_{HFE}$ 1112 to the Internet 1128.

Flow controllers, internal network flow controller $IP_{HFI}$ 1110, and external network flow controller $IP_{HFE}$ 1112, are placed on both sides of the firewalls to ensure that traffic for a given client-server session flows through the same firewall in both inbound and outbound directions. The firewalls perform filtering operations and/or network address translation (NAT) services. In both cases, the flow controllers supply high availability, scalability, and traffic distribution for the firewalls in the firewall cluster.

Additional firewalls may be added to the firewall clustering system 1100. For example, a data management zone (DMZ) firewall cluster 1132 connects a DMZ internal network 1134 to the internal firewall cluster $IP_{Cint}$ 1118 and the external firewall cluster $IP_{Cext}$ 1116. A DMZ network flow controller 1136 manages the DMZ firewall cluster 1132.

Various implementations of the firewall clustering system 1100 have several features and benefits of firewall clustering. Both inbound and outbound traffic are distributed between firewalls on both the internal 1140 and external 1142 sides of the firewalls Firewall1 1114 and Firewall2 1115. The flow controllers, internal network flow controller $IP_{HFI}$ 1110, and external network flow controller $IP_{HFE}$ 1112, distribute traffic based on the source and destination IP addresses of a packet, ensuring that all IP-based protocols are supported.

In some embodiments, all outgoing traffic for a single client-server session are handled by the same firewall in both the inbound direction and the outbound direction. The flow controllers support unlimited client-server sessions. For communication interconnects using the firewall clustering system 1100, servers 1150 need not be configured with multiple-firewall IP addresses for a gateway. Servers 1150 are configured to use a single 'logical' firewall having an IP address identifying the internal firewall cluster $IP_{Cint}$ 1118.

Routers 1130 can be configured with either a single or multiple firewall IP addresses for a gateway. Routers 1130 are configured to use a single "logical" firewall having an IP address the same as the external firewall cluster.

In some implementations, the firewall clustering system 1100 continually monitors the operational health of the routers 1130, the firewalls, and associated internal and external links.

In some implementations, the firewall clustering system 1100 detects one or more of various failure conditions including: (1) failure of the firewall internal LAN interface and link, (2) failure of the firewall external LAN interface and link, and (3) failure of the firewall due to power outage, software malfunction, hardware malfunction, or other condition. When the firewall clustering system 1100 detects a failure, traffic is automatically forwarded to the remaining operational firewall or firewalls in both the inbound and outbound directions. The firewall clustering system 1100 does not require manual intervention at the server to bypass the failed firewall.

The firewall clustering system 1100 supports Ping functionality and Address Resolution Protocol (ARP) for detection with data management zone (DMZ) support. A configuration of a firewall clustering system 1100 can also cluster three interfaces including external 1142, internal 1140, and data management zone (DMZ) 1144 regions. One flow controller is connected to each interface of the firewalls for the internal, external, and DMZ zones for a total of three flow controllers: internal network flow controller $IP_{HFI}$ 1110, external network flow controller $IP_{HFE}$ 1112, and DMZ network flow controller 1136.

Additional firewalls may be seamlessly added to supply additional bandwidth and greater fault-tolerance.

The firewall clustering system 1100 operates in a manner that is independent of the firewall hardware and software. Various combinations of firewalls can exist in the cluster.

The firewall clustering system 1100 includes multiple control processes that execute on the internal network flow controller $IP_{HFI}$ 1110, the external network flow controller $IP_{HFE}$ 1112, the DMZ network flow controller 1136, and associated passive flow controllers. One control process is a firewall-cluster creator that creates or configures the firewall clusters 1116 and 1118.

Figure 13:
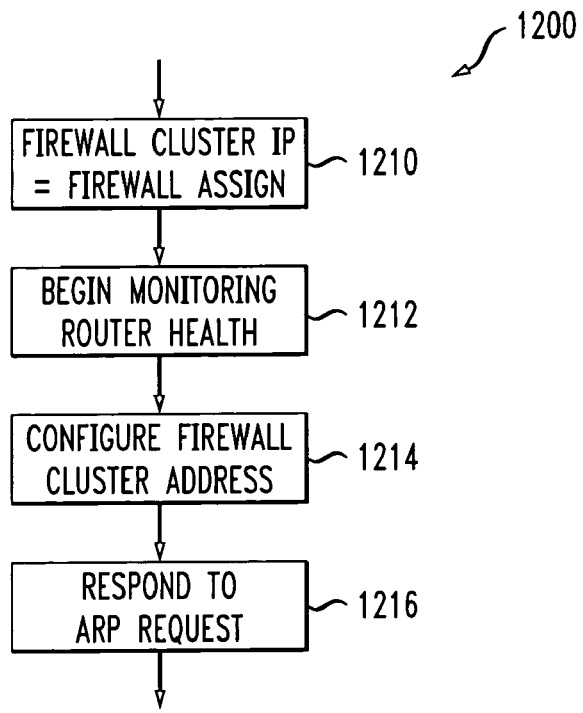
FIG. 13 is a schematic flowchart showing operations of a firewall cluster creator.

Referring to FIG. 13 in conjunction with FIG. 12, a schematic flow chart depicts operations of a firewall cluster creator 1200.

To create or configure the firewall clusters 1116 and 1118 on both internal and external network flow controllers 1110 and 1112, in a firewall cluster IP and firewall assignment operation 1210 an administrator assigns to the cluster a logical Internet protocol (IP) address $IP_{Cint}$. The administrator also specifies firewalls, Firewall1:$IP_{F1int}$ 1124 and Firewall2:$IP_{F2int}$ 1125, as members of the firewall cluster 1118. The IP address of an external network flow controller ($IP_{HFE}$) 1112 is configured as a peer unit that is probed using Ping packets at a configured polling interval. If the firewalls are performing NAT, then the firewall cluster zone is configured as internal 1140.

To create a firewall cluster 1116 on an external network flow controller 1112, the administrator assigns the cluster a logical IP address $IP_{Cext}$ and specifies firewalls, Firewall1:$IP_{F1ext}$ 1126 and Firewall2:$IP_{F2ext}$1127, that are members of the firewall cluster 1116. The IP address of an internal network flow controller ($IP_{HFI}$) 1110 is configured as a peer unit that is probed using Ping packets at a configured polling interval. If the firewalls are performing NAT, then the firewall cluster zone is configured as external 1142.

In a begin monitoring firewall health operation 1212, the internal and external network flow controller units 1110 and 1112 monitor the health of the firewalls 1118 and 1116. The network flow controller units 1110 and 1112 send Ping packets through both the internal and the external firewalls 1118 and 1116, effectively testing the operational state of the firewall and the internal and external links.

In a configure firewall cluster address operation 1214, which may be optional, the logical internal firewall cluster address $IP_{Cint}$ is configured on the servers 1150 at the site as a 'default' gateway rather than a unique IP address of one of the firewalls internal interfaces $IP_{F1int}$ 1124 and $IP_{F2int}$ 1125. The logical external firewall cluster address $IP_{Cext}$ is configured on the servers 1150 at the site as a 'next-hop' gateway rather than a unique IP address of one of the firewalls external interfaces.

In a respond to ARP request operation 1216, the internal network flow controller 1110 responds to an Address Resolution Protocol (ARP) request from the servers 1150 to identify a Media Access Control (MAC) address associated with the firewall cluster $IP_{Cint}$. The external network flow controller 1112 responds to an Address Resolution Protocol (ARP) request from the servers 1150 to identify a Media Access Control (MAC) address associated with the firewall cluster $IP_{Cext}$.

Figure 14:
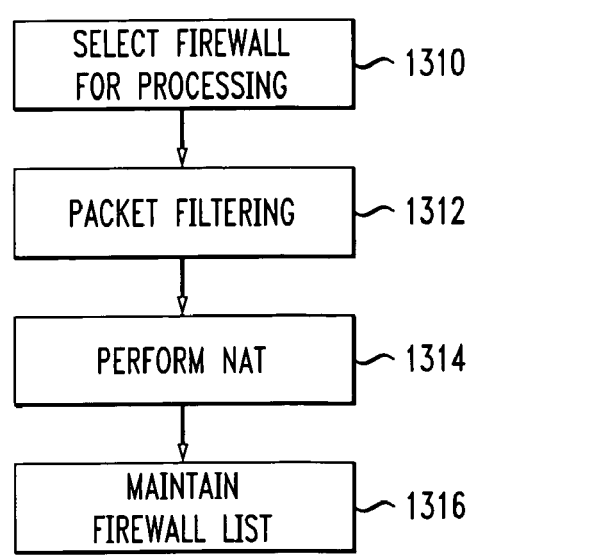
FIG. 14 is a schematic flow diagram showing operations of a traffic distributor.

Another control process is a traffic distributor that includes internal and external network flow controller units 1110 and 1112 that mutually distribute message traffic. Referring to FIG. 14 in combination with FIG. 12, a schematic flow diagram shows operations of a traffic distributor 1300. The traffic distributor executes from the network flow controllers 1110 and 1112. The traffic distributor 1300, in a select firewall for processing operation 1310, selects a firewall from among the firewall clusters 1116 and 1118 to forward the traffic based on information in the packet header. In a packet filtering operation 1312, the firewalls 1116 and 1118 are only performing packet filtering, and both the internal and the external network flow controller units 1110 and 1112 use the source and destination IP address and port to identify the client-server flow.

When the firewalls are performing NAT operation 1314, the external network flow controller unit 1112 uses the packet source IP address to distribute inbound traffic for the firewall cluster 1116. The internal network flow controller unit 1110 uses the packet destination IP address to distribute outbound traffic for the firewall cluster 1118. For example, the IP address of a device on the Internet corresponds both to the source IP address for the external unit and the destination IP address for the internal unit. Both network flow controller units 1110 and 1112 use the same packet information to determine the traffic distribution.

In a maintain firewall list operation 1316, each of the network flow controller units 1110 and 1112 internally maintains a list of operational firewalls. Fields from the packet are used to compute the index into the list, indicating the firewall that is to be used. To ensure that the same firewall is selected by both the internal flow controller and the external flow controller, the order of configuration of the firewalls must be the same on both network flow controller units. Thus, for any given client-server connection flow, the same firewall is used by both the internal and external network flow controller units for every inbound and outbound packet, so long as the firewall remains operational.

Each firewall has an equal probability of assignment for a flow for processing, since the traffic distributor uses only information in the packet IP header to select between firewalls. Processing load or potential processing power of the firewall is not analyzed in the selection.

Figure 15:
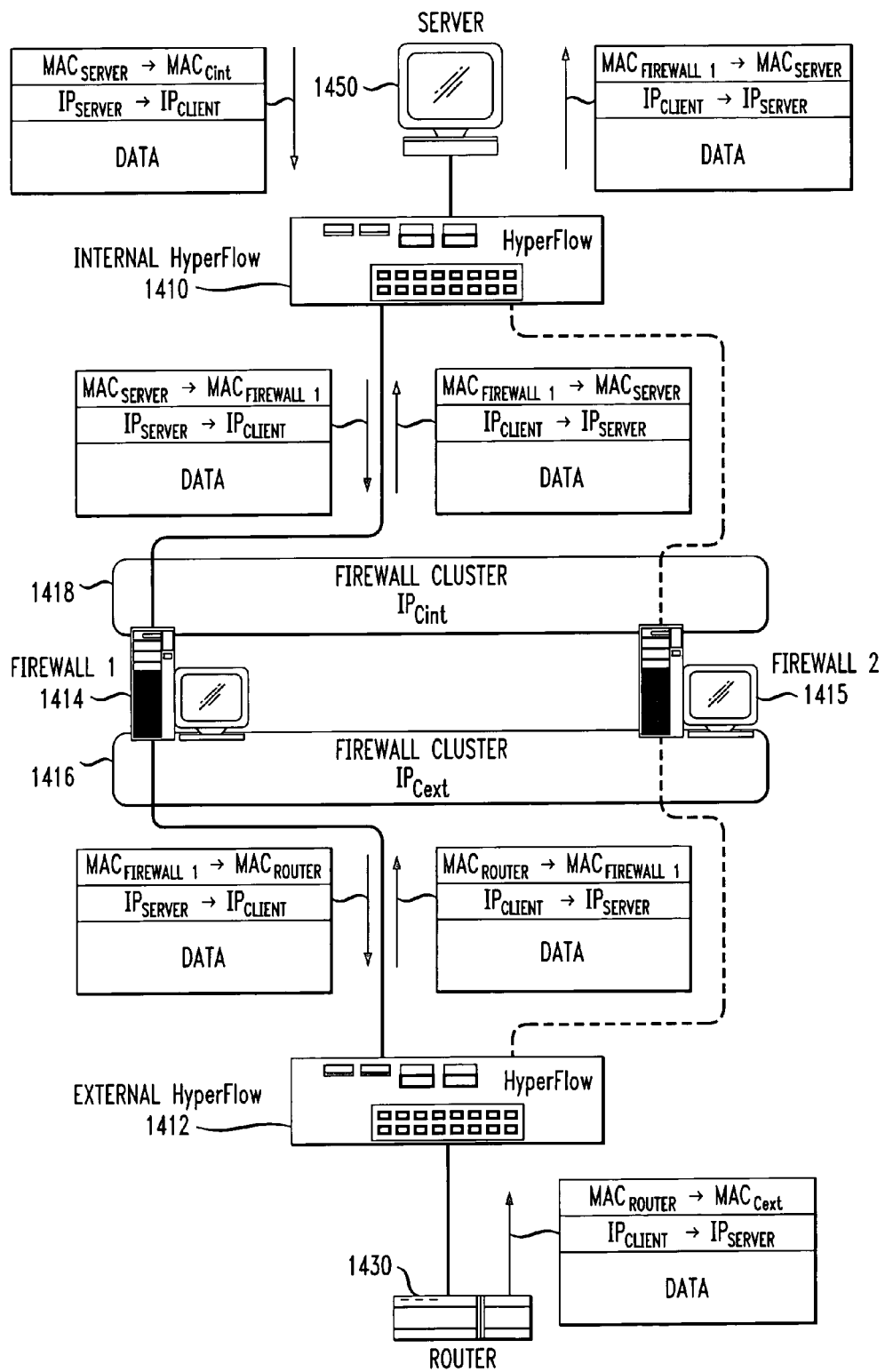
FIG. 15 is a schematic block diagram and associated transition tables that illustrate a technique for transferring a packet between a server and a client using a firewall clustering system.

Referring to FIG. 15, a schematic block diagram and associated transition tables depicts a technique for transferring a packet between a server 1450 and a client that is assigned to use Firewall1 1414 by an internal network flow controller $IP_{HFI}$ 1410 and an external network flow controller $IP_{HFE}$ 1412. The IP address of the firewall cluster $IP_{Cint}$ and $IP_{Cext}$ do not appear in the packet, since the firewall cluster 1416 or 1418 is only a gateway on a path between the source and the actual end destination. The IP address of the firewall will appear in the packet if NAT is performed on the firewalls.

Figure 16:
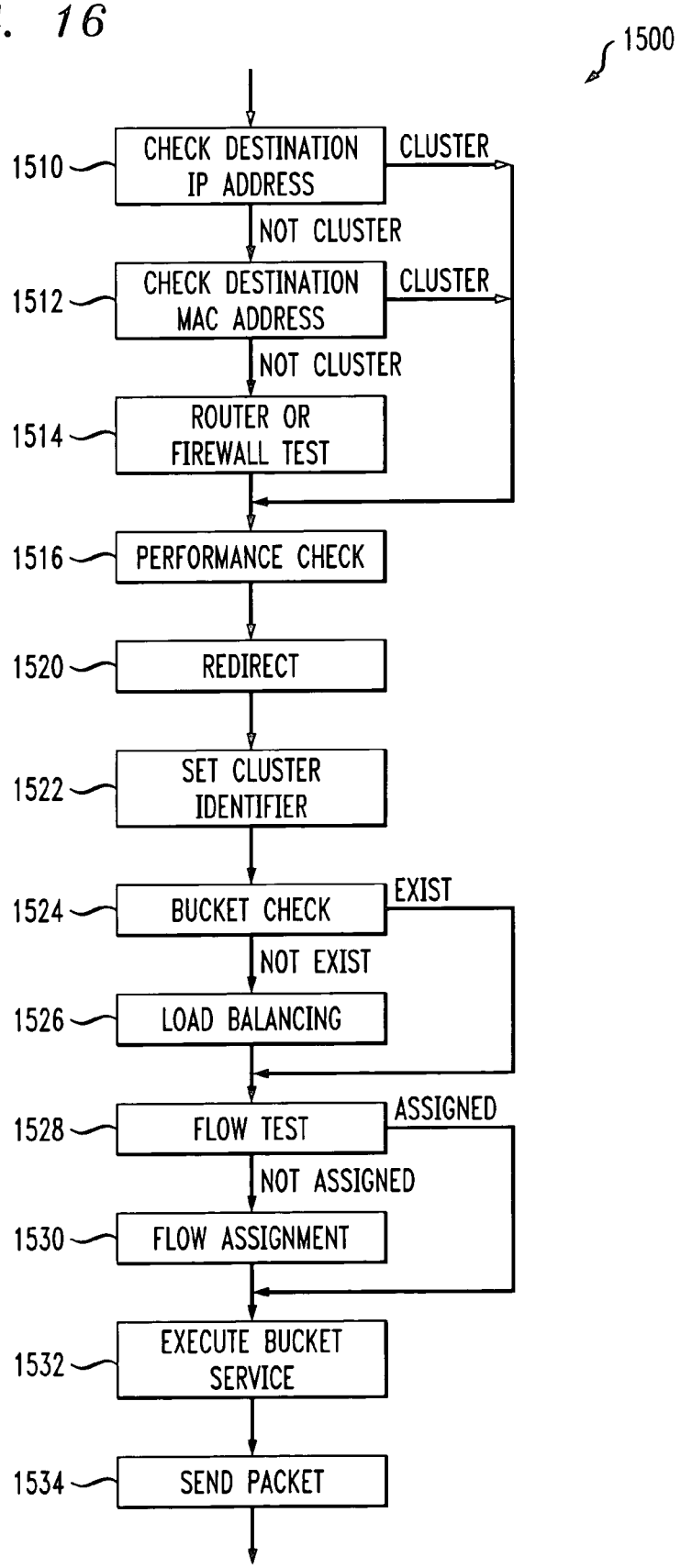
FIG. 16 is a flow diagram that illustrates a further implementation of a traffic distribution method.

Referring to FIG. 16, a flow diagram illustrates a traffic-distribution method 1500. In a check destination IP address operation 1510, a traffic distributor checks the destination IP address of a packet to determine whether the destination IP address is a cluster address. If so, the traffic distributor in a performance check operation 1516 verifies performance of routers within the cluster, then may redirect flow in a redirect operation 1520 if warranted by results of the performance check operation 1516.

If the check destination IP address operation 1510 determines that the destination IP address is not a cluster address then, in a check destination MAC address operation 1514, the traffic distributor checks to determine whether the destination MAC address is a cluster address. The destination MAC address matches the cluster address when a Proxy ARP is used to indicate to attached routers that the MAC address of the network flow controller is used when sending packets to any of the configured cluster IP addresses. If the MAC address matches the cluster address, the traffic distributor in the performance check operation 1516 verifies performance of routers within the cluster, then may redirect flow in the redirect operation 1520 if warranted by performance check results.

If the check destination MAC address operation 1512 determines that the MAC address is not a cluster address then, in a router or firewall test operation 1514, the traffic distributor performs router/firewall pooling, using the MAC address to determine whether the MAC address specifies a router or a firewall. In the redirect operation 1520, the traffic distributor redirects traffic to one of the routers or firewalls in the cluster, if redirection is warranted. Generally, traffic is redirected within routing cluster elements for any new packet for string of packets. Thus, the first packet in a flow is generally redirected and subsequent packets are directed to the same routing cluster element as the first packet. A first redirection operation is a set cluster identifier operation 1522 in which the cluster address in the form of either the MAC address or the destination IP address is set to identify the cluster data structure. A bucket check operation 1524 determines whether at least one bucket exists in a cluster data structure. If the cluster data structure does not include at least one bucket, a load balancing operation 1526 retrieves an appropriate bucket that attains load balancing.

A flow test operation 1528 determines whether the flow is assigned to the bucket and, if not, performs a flow assignment operation 1530 that assigns buckets to a server. The traffic distributor executes a bucket service operation 1532 with the buckets used to forward data requests from clients to servers. A packet is then sent to the firewall in send packet operation 1534.

Figure 17:
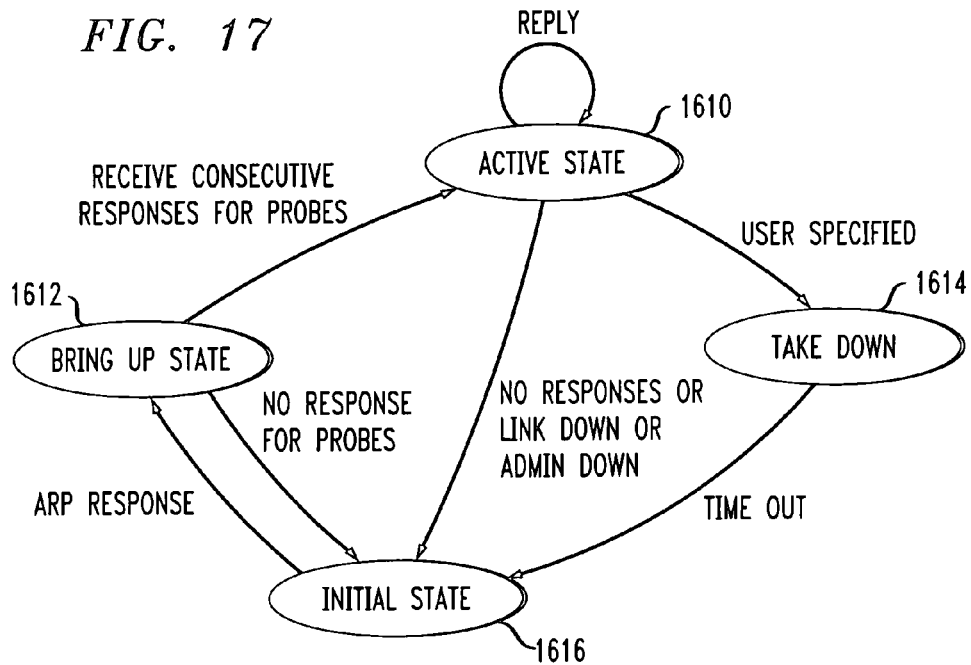
FIG. 17 is a schematic state diagram showing operation states of a technique for distributing traffic using clustering.

Referring to FIG. 17, a schematic state diagram shows operational states of a technique for distributing traffic using clustering. In an Initial State 1616, routers or firewalls in a cluster are inactive and no messages are routed between the servers and clients. A cluster is configured in the Initial State 1616. The Initial State 1616 is receptive to ARP probe methods for monitoring the routers in the firewall cluster. An ARP response while in the Initial State 1616 causes a state transition to a Bring-Up State 1612. In the Bring-Up State 1612, the receipt of consecutive responses to ARP probes causes a transition to an Active State 1610. If no responses for ARP probes are received, the state transitions from the Bring-Up State 1612 back to the Initial State 1616. In the Active State 1610, regular replies are made to the ARP probes while active traffic distribution takes place.

Several conditions terminate the Active State 1610. If no responses for ARP probes are received, the state transitions from the Active State 1610 to the Initial State 1616. Similarly, termination of a link or an administrator request to terminate the Active State 1610 cause the Active State 1610 to transition to the Initial State 1616. A user-specified command causes the Active State 1610 to transition to a Take-Down State 1614 which, in turn, transitions to the Initial State 1616 upon the occurrence of a time-out.

Figure 18:
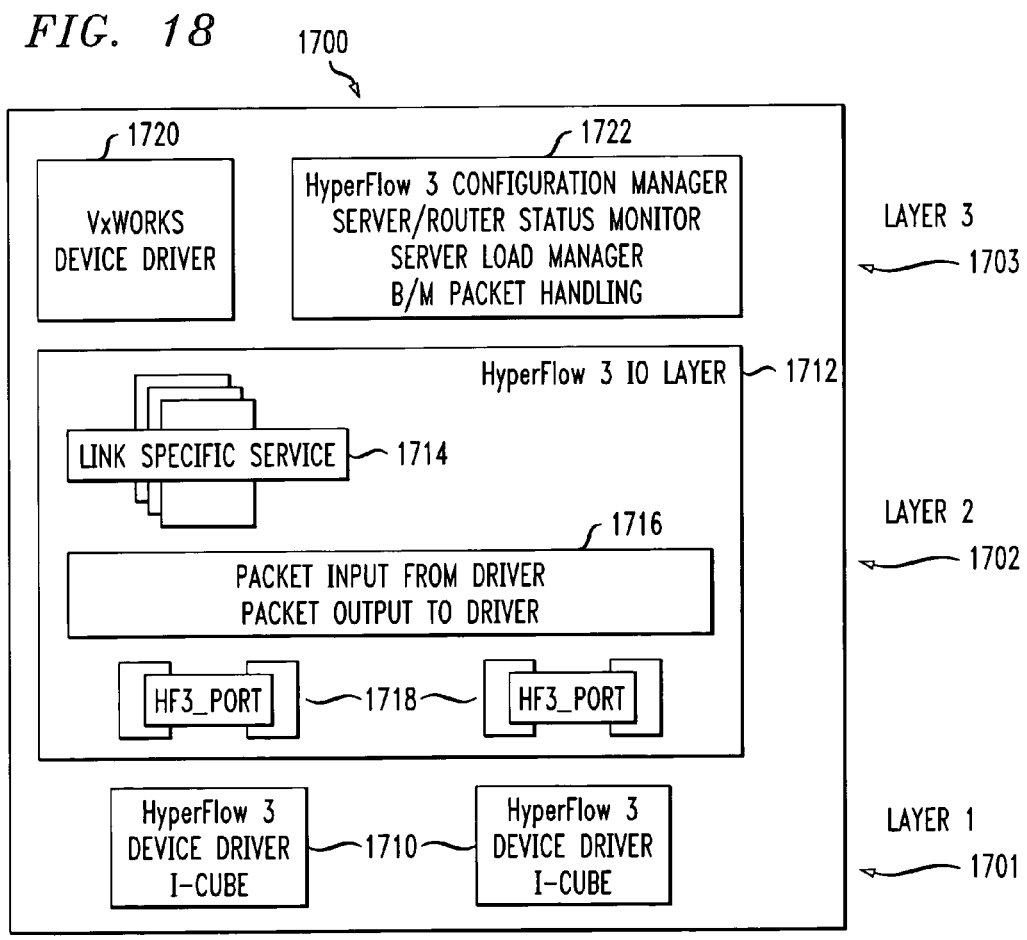
FIG. 18 is a schematic block diagram showing a system architecture including an arrangement of packet-forwarding layers for a packet-forwarding software module.

Referring to FIG. 18, a schematic block diagram shows a system architecture including an arrangement of packet-forwarding layers for a packet-forwarding software module 1700. The packet-forwarding module defines clustering functionality and interfaces for either firewalls or firewall clusters. Packet-forwarding software executes on a commercial processor in combination with a commercially-available switching chip-set. The packet-forwarding software executes in conjunction with load-balancing software.

A suitable load-balancing software is described in co-pending application Ser. No. 08/992,038, now U.S. Pat. No. 6,601,084, entitled "Dynamic Load Balancer for Multiple Network Servers." It uses hashing to separate data requests from clients into a plurality of buckets to consistently balance the load on a plurality of servers. Buckets are dynamically assigned to the server having the lightest load, as necessary. The load balancer tracks the state of each server. A server is in the non-operational state if deemed unable to perform the service. The load balancer maintains a list of operational services and assigns load only to servers that are operational. A server fault-tolerance mechanism in the load balancer detects when a server goes down and redistributes the load to the new set of operational servers. When a previously non-operational server becomes operational, traffic is redistributed over the new set of operational servers. Redistribution does not disrupt existing client-server connections.

The packet-forwarding software supports several aspects of operation including switching, high availability, fault-tolerance, clustering, and Ethernet switching.

At a base level, the packet-forwarding module 1700 has device-drivers 1710 in a layer-1 1701. In a layer-2 1702, an IO layer 1712 overlies the device-drivers 1710, and includes a link-specific service 1714 and packet communications 1716, including packet input from a driver and packet output signals to the driver. The IO layer 1712 communicates with the device-driver (I-Cube) layer 1701 via ports 1718. In a layer-3 1703 overlying the IO layer 1712 are a VxWorks Device Driver 1720 and a configuration manager 1722 that supports various functionalities including server/router status monitoring, server load management, and bill-of-material packet handling.

Packet forwarding occurs when a network flow controller receives a packet from a specific port and the packet is destined for a device on a network. Flow is controlled based on the port type of the port at which traffic is received and by the layer-3 Internet protocol (IP) address of the destination. The module receives a packet from one device driver and forwards the packet to another device driver. A separate Service Access Point (SAP) is defined by the packet-forwarding software and identifies each port. The packet-forwarding module includes a plurality of forwarding handlers including a handler for packet forwarding for Network Port types, and an IO layer Applications Programming Interface (API). The packet-forwarding software interfaces to modules including a server/cluster software module, a router/pool software module, a bucket state machine, and a traffic-distribution module.

The packet-forwarding module receives packets from a device driver of the network flow controller and forwards the received packets to another device driver. The type of service that a packet receives is based on the type of link. Link types include server, router and network types.

Router and firewall clustering functionality supports scaling of routers and firewalls without having to reassign default gateways and static routes to any node in a subnet behind the router or firewall. All nodes in a LAN can use one gateway layer-3 1703 address, and the network flow controller will distribute the traffic to different routers/firewalls in the cluster, attaining high-availability and fault-tolerance.

For firewalls, additional support manages a flow state using "sticky" connection features. The network flow controller supports multiple router/firewall clusters, in one illustrative configuration up to four. Network objects in a LAN use the router/firewall cluster as a default gateway to connect to additional networks. The network flow controller assumes that the router/firewall cluster has forwarding knowledge for the connections. Traffic sent to a layer-2 1702 address is forwarded to the specific router/firewall depending on the load on the routers/firewalls in the cluster.

The packet-forwarding software includes a plurality of major functions including a port handler initialization function, a packet-forwarding IO layer API, a packet-forwarding packet from Network type port function, and a packet-forwarding to Cluster handler function. Other functions include a get aggregate flow channel (bucket) function, a get IP address to determine load balancing function, a packet-forwarding packet to pool member function, and a packet-forwarding packet to pool member function.

The packet-forwarding module port handler initialization function initializes the port function handlers and sets the port type. The packet forwarding module port handler initialization function has a synopsis of fwd_setPortType (port_t, *pszPort, int type) and includes two parameters, a port_t pointer to the port parameter and an int_type designator of a type to which the port is set. One implementation of the port handler initialization function is as follows:

```
If( port is NETWORK)
{
    switch(port type)
    {
        case SERVER:
            decrement object count on the port;
            break;
        default:
            break;
    }
}
switch( port type )
{
    case SERVER:
        set type to SERVER;
        increment object count on the port;
```

```
        set link handler to pf_inputPacketFromServerPort( );
        break;
    case ROUTER:
        set type to ROUTER;
        increment object count on the port;
        set link handler to pf_inputPacketFromRouterPort( );
        break;
    default:
        if (server object count and router object count is 0) {
            set type to NETWORK;
            set link handler to pf_inputPacketFromNetworkPort( );
            break;
}
```

The packet-forwarding IO layer API is a function that handles incoming packets and has a synopsis fwd_inputPacket (cookie_t *pCookie, data_t *pszData). The parameters include Cookie_t that identifies a port cookie from the driver and a data_t pointer to the data. The packet-forwarding IO layer API defines local and global variables, validates the port header size, validates the source port, gets the system run mode and required parameters, and gets the packet type from the data. In an illustrative system, the packet-forwarding IO layer API function operates as follows:

```
Switch (type)
{
    case ETHER_TYPE_IPV4:
        call the link handler to process IP packet;
        break;
    case ETHER_TYPE_ARP:
        call the ARP input handler
        break;
    default:
        if (Multicast packet)
            Broadcast to all ports except port it came on
        Else
            Send packet to the MAC address from the table
        Break;
}
```

The packet-forwarding packet from Network type port function is a function handler for a packet coming in on a Network type port and has a synopsis of fwd_inputPacketFromLinkType. Parameters of the function include a port_t Pointer to the port, and a data_t Pointer to the data. The packet-forwarding packet from Network type port function defines and/or initializes local and/or global variables, then gets the destination IP address from the data. Pseudocode describing operation of the packet-forwarding packet from Network type port is as follows:

```
If (destination is one of our clusters)
{
    call the cluster handler;
    return;
}
if (destination is the operating system)
{
    if (source port is a firewall type port)
    {
        if (packet is an ICMP packet)
        {
            if (group=fwdGetGroupFromPeerIP(port, data))
            {
                ICMP peer IP Handler
                Return;
            }
        }
        if (system access is not disabled)
        {
            queue packet for the operating system;
            return;
        }
        if (packet is Multicast)
        {
            Create duplicate packet and Queue to operating system;
            Broadcast packet to all port except for it came in on.
            Return;
        }
        if (Check for pool member by MAC address)
        {
            if (Router redirection set)
            {
                call the redirection handler;
                return;
            }
            /* Check for Router Fault Tolerance */
            if (pool Group is not null and pool Group forwarding set)
            {
                call Pool fault tolerance handler (fwd_poolMemhndlr( ));
                return;
            }
        }
        if (router type cluster or firewall type cluster)
        {
            call cluster handler;
            return;
        }
}
Free data;
return;
```

The packet-forwarding to Cluster handler function that handles forwarding of packets to the cluster and has a synopsis Void fwd_toClusterHandler (CLUSTER_T *pCluster, DATA_T *pData, PORT_T *pPort). The parameters include a Cluster_t pointer to the cluster data, a Port-t pointer to the port, and a Data_t pointer to the data. The packet-forwarding to Cluster handler function defines and/or initializes local and/or global variables. In an illustrative system, the packet to Cluster handler function operates as follows:

```
if (a redirection member record is included)
{
    update the L2 address;
    send packet to the destination server;
    return;
}
```

Following the function, the packet is sent to the router/firewall in the cluster. The function gets the bucket for the flow based on the cluster group type and executes the bucket state machine.

The get aggregate flow channel (bucket) function returns the pointer to the aggregate flow, which is also called the bucket, for the cluster. The get aggregate flow channel (bucket) function has a synopsis of BUCKET_T *getAggregateFlowChannel (DATA_T *pData, PORT_T *pPort, CLUSTER_T *pCLuster, UINT32_T *puiIndex). The parameters include a Cluster_t pointer to the cluster data, a Port_t pointer to the port, a Data_t pointer to the data, and a UINT32 reference pointer to the bucket index. The function returns BUCKET_T*. The get aggregate flow channel (bucket) function defines and/or initializes local and/or global variables then gets the layer-3 address based on the cluster group type. The function gets the aggregate flow index from the IP address and returns the pointer to the bucket.

The get IP address to determine load balancing function returns the layer-3 address which determines the load-calculating variable. The get IP address to determine load balancing function has a synopsis of UINT32 ipv4_loadDeterminationAddr (DATA_T *pData, PORT_T *pPort, CLUSTER_T *pCluster). The parameters include the Cluster-t pointer to cluster data, the Port_t pointer to the port, and the Data_t pointer to the data. The function returns a UINT32 IP address. The get IP address to determine load-balancing function is described by pseudocode as follows:

```
switch (Cluster Get Group Type)
{
case CROUTER:
    return destination IP address from the packet.
Case CFIREWALL:
    switch (get firewall zone)
    {
    case FIREWALL_INTERNAL:
        return destination IP address from the packet.
    case FIREWALL_EXTERNAL:
        Return source IP address from the packet.
    case FIREWALL_NONE:
    default:
        return sum of source and destination IP address from packet.
    }
case CSERVER:
case CVPN:
default:
    return source IP address from the packet.
}
```

A packet-forwarding packet to pool member function is a handler for pool member redirection and router/firewall pooling and has a synopsis of Void fwd_toPoolMemberHandler (VMEMBER_T *pMember, PORT_T *pPort, DATA_T *pData). The parameters include a Vmember_t pointer to member data, a Port_t pointer to the port, and a Data_t pointer to the data. The function returns Void. The packet-forwarding packet to pool member function defines and/or initializes local and/or global variables, then functions according to the following pseudocode:

```
If (member redirection to a cluster exists)
{
    forward to a cluster handler;
    return;
}
else
{
    forward packet to forwarding router;
    return;
}
```

A packet-forwarding packet to forwarding member function forwards traffic to the forwarding member. The function has a synopsis of Void fwdPacketToForwardingMember (VMEMBER_T *pMember, DATA_T *pData). The parameters include a Vmember_t pointer to the member data and a Data_t pointer to the data. The function returns Void. The packet-forwarding packet to pool member function first defines and/or initializes local and/or global variables, then initializes the original member and gets the pool from the member data. The function pseudocode is, as follows:

```
If (member found forwarding member in pool)
{
    copy the layer-2 address from the member data into data;
    send packet to the link from the member data;
    return;
}
else
{
    if (send packet to original member failed)
    {
        freedata;
    }
    return;
}
```

Figure 19:
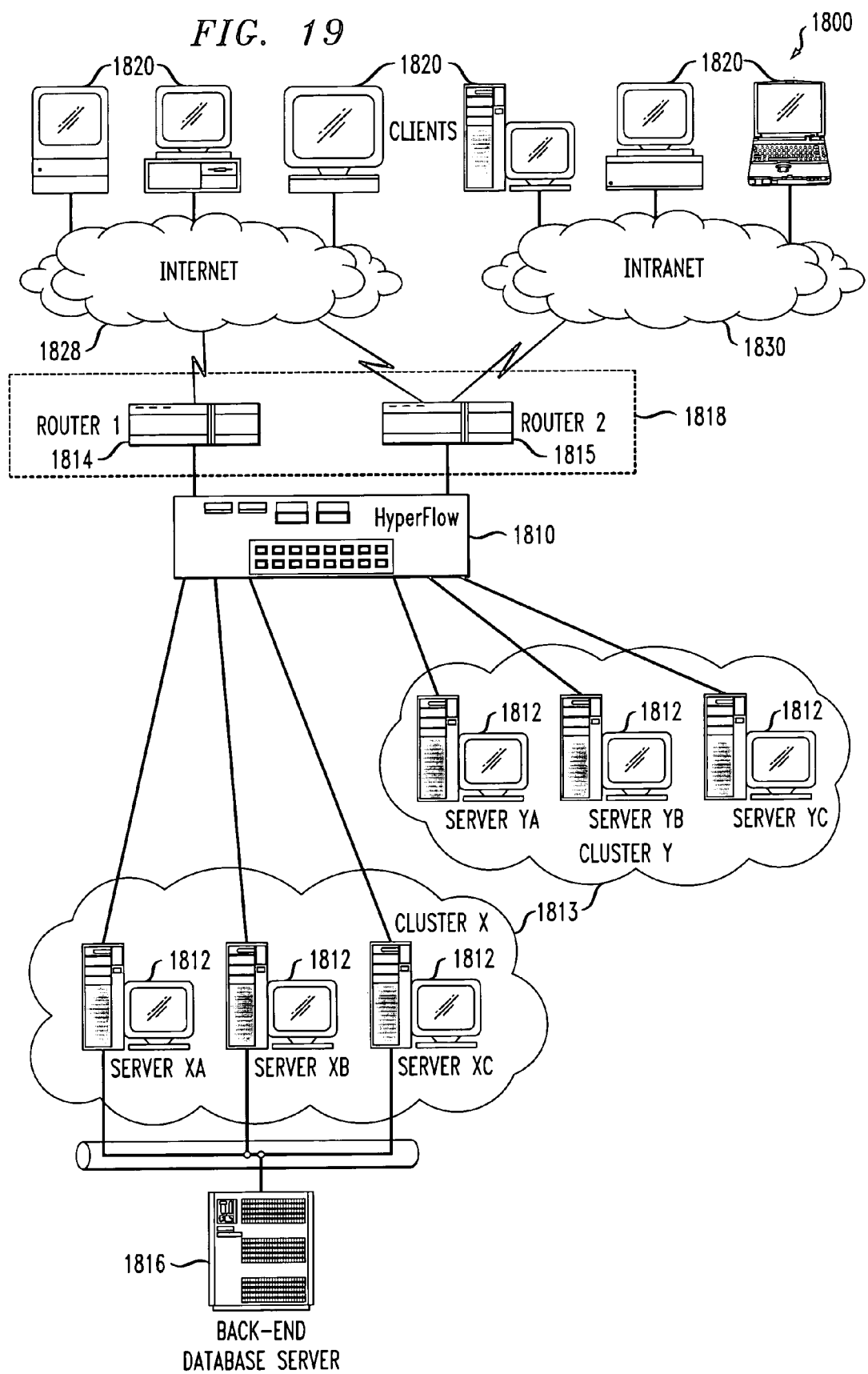
FIG. 19 is a schematic block diagram showing an example of a clustering system within a network topology.

Referring to FIG. 19, a schematic block diagram shows an example of a clustering system and network flow controllers 1810 within a network topology 1800. The example shows a network flow controller 1810 that arranges system elements into clusters at stages of communication flow from servers to clients. The network flow controller 1810 is connected to a plurality of servers 1812 and arranges the plurality of servers 1812 into server clusters 1813, including a cluster X and a cluster Y. In the illustrative example, servers 1812 in the cluster X are interconnected to a back-end database server 1816. The network flow controller 1810 is also connected to Firewall1 1814 and Firewall2 1815 and arranges the two routers into a firewall cluster 1818. The routers are connected to one or more networks, such as an Internet 1828 and an Intranet 1830. The networks are further connected to clients 1820.

In an illustrative system, a network flow controller 1810 is available with 8 or 16 auto-negotiating Fast Ethernet ports to supply a high-speed interconnect for server—server and client-server communication.

The network flow controller 1810 attains high-availability through fault-tolerance. Within the network flow controller 1810, dual power supplies and intelligent fans ensure that operation continues even under adverse environmental operating conditions. Two or more network flow controllers 1810 may be linked for redundancy that eliminates a single point of failure within the cluster. Multiple network flow controllers 1810 can cooperate in an active-standby or active—active fail-over mode. The network flow controllers 1810 can exchange heartbeat and configuration information over a dedicated Fast Ethernet port.

The network flow controller 1810 intelligently distributes Internet protocol (IP) traffic across multiple replicated servers 1812. The network flow controller 1810 uniquely identifies a group of replicated servers 1812 by a single IP address. Traffic destined for the cluster IP address is distributed across the servers 1812 within the server cluster 1813 by the network flow controller 1810. All clients 1820 accessing the servers 1812 are presented only the cluster IP address, with the presence of the plurality of replicated servers 1812 and the identity of the specific server to which the traffic is forwarded within the cluster hidden.

In the illustrative system, the network flow controller 1810 configures two server clusters 1813, Cluster X and Cluster Y, with a plurality of servers 1812 associated with each cluster 1813. Cluster X has three servers 1812: Server XA, Server XB, and Server XC, that supply access to a back-end database server 1816. Cluster Y also has three servers: Server YA, Server YB, and Server YC. Two routers, Firewall1 1814 and Firewall2 1815, supply access to the servers 1812 over an Intranet 1830 and an Internet 1828. A potentially-large number of clients 1820 access the servers 1812 through the routers.

The servers 1812 in Cluster X are individually capable of supplying the same set of services to clients. The Cluster X servers 1812 are 'front-ends' for a shared server which maintains data synchronization. The clients 1820 view any server 1812 within the cluster as being capable of processing requests. The network flow controller 1810 groups functionally-similar servers 1812 in a cluster to distribute a load from the clients 1820 amongst the plurality of servers 1812.

The servers 1812 in Cluster Y may perform an entirely different set of services to clients 1820. In one example, the servers 1812 in cluster Y are independent replicated servers with timing connections to maintain data synchrony. From the perspective of clients 1820, any server within cluster Y is capable of processing requests. The network flow controller 1810 fits into a network topology between a router and the servers. From the perspective of network flow controller 1810, ports that connect to the servers 1812 are know as Server Ports. The network flow controller 1810 ports that connect to the routers are called Router Ports.

Each server has a unique IP address, called a server management address, which can be used for administration purposes. Servers within a cluster also share a same 'logical' IP address, called a cluster IP address. Clients 1820 direct requests to the cluster IP address, not to a server management address.

The network flow controller 1810 uses Proxy ARP to indicate to attached routers that the MAC address of the network flow controller 1810 should be used when sending packets to any of the configured cluster IP addresses. The network flow controller 1810 responds to ARP request for the cluster IP address by sending the network flow controller 1810 MAC address, ensuring that all traffic destined for the servers 1812 within a cluster is sent to the network flow controller 1810 by the routers.

When network flow controller 1810 receives a packet from a router, the destination IP address determines the cluster for which the packet is targeted, and the source IP address determines the server within the cluster to which network flow controller 1810 will forward the packet.

When a packet arrives from a new client, a client having a source IP address that is not yet mapped, network flow controller 1810 associates the client with the least-loaded server at the time of arrival.

A "static" association exists between a client source IP address and the server within a cluster that processes packets from the client. In the static association, once the association is configured, the association remains for subsequent packets from the same source. A common term for the static association is a flow. The flow between the selected server and the source IP address is timed. While traffic continues to arrive from the source IP address destined for the cluster IP address, the association remains valid. If the traffic from the source IP address to the cluster IP address stops for more than a selected period, the association terminates. Internal to network flow controller 1810, a hash table stores flow information. A has table maps a large set of values into a much-smaller set, so that two different source IP addresses may be mapped to the same table entry. When multiple IP addresses are mapped to the same table, the source IP address that arrives later uses the same association as was set by the first source IP address, even through the flow is distinct and different. The hash table permits aggregation of flows. As new flows arrive, the new flows will either create new associations if the mapped hash entry is unassigned, or the new flows use previously configured associations if the mapped hash entry is already assigned. The network flow controller 1810 maintains a separate hash table for each cluster.

Network flow controller 1810 continually monitors the servers 1812 to detect non-operational conditions. If a servers 1812 within a cluster fails, network flow controller 1810 reassigns all hash-table entries that are associated with the failed server to other servers within the cluster.

Routers send packets destined for the cluster IP addresses to network flow controller 1810. The packets have a destination MAC address associated with network flow controller 1810, and a destination IP address associated with the cluster. Once network flow controller 1810 has determined which server is to receive forwarded packets, the network flow controller 1810 replaces the destination MAC address to identify the selected server and sends the packet via the interface to which the server is attached. The server has the same IP address as the cluster IP address; no change is made to the packet IP header or payload.

For network traffic in the opposite direction, from the server 1812 back to a client 1820, network flow controller 1810 simply forwards the MAC or IP header to the router without modification. The network flow controller 1810 does not modify the MAC or IP header of the packets, and the packets are forwarded by the network flow controller 1810 switches.

In addition to monitoring the operational state of the servers 1812, network flow controller 1810 similarly monitors the attached routers. If a router fails, network flow controller 1810 intercepts packets destined for the failing router and rewrites the MAC destination address to address an alternative router. For example, if Firewall2 1815 fails, then Firewall1 1814 is used to ensure continued connectively to the Internet 1828.

The network flow controller 1810 intelligently distributes traffic by directing client traffic that is sent to a cluster IP address to specific servers within the cluster. The network flow controller 1810 distributes traffic on a per-aggregated flow basis.

Traffic from any client having a source IP address that is mapped to a flow is sent to the assigned server. The network flow controller 1810 rewrites the destination MAC address to the address of the assigned server, replacing the address of network flow controller 1810. For each packet, network flow controller 1810 determines the cluster to which the packet is targeted and the assigned server for the source IP address. The network flow controller 1810 then rewrites the destination MAC address to be the address of the assigned server and forwards the packet on the appropriate server port.

At any time, any number of clients can use the same flow. Network flow controller 1810 does not normally keep any information, in terms of count or actual client IP addresses, that associates particular clients to a particular flow.

Association of a server with a particular collection of client IP addresses is timed. After a period of inactivity in which no packets are received from any clients mapped to that flow, the association is purged.

Potentially, each server within a cluster may have multiple IP addresses. One of the server IP addresses must be the address of the cluster to which the server is associated. The server may have other IP addresses, used for management and administration purposes. The network flow controller 1810 does manage traffic for the server management IP addresses. Traffic management is only performing on traffic destined for the cluster IP address. Traffic destined for server management IP addresses is handled by switches within network flow controller 1810, and is not processed by the processor in the network flow controller 1810.

When a large number of clients 1820 may be accessing the servers 1812 through a proxy server, network flow controller 1810 more evenly distributes traffic. The network flow controller 1810 can be configured to include a TCP source port number in packet information used to distribute traffic. When enabled, the traffic distributor, which is configurable on a per-cluster basis, identifies a flow by using the packet source IP address, destination IP address and, if available, the TCP source port number. Non-TCP traffic continues processing using Layer-3 information including source and destination IP addresses, and is not affected by the traffic distributor.

The network flow controller 1810 implements traffic-distribution methods that allow an administrator to tune the traffic management. The network flow controller 1810 selects a server when a flow from a client arrives which was not recently assigned to a server. The network flow controller 1810 supports a plurality of traffic-distribution methods including round-robin, least-used flow, and weighted methods.

In the round-robin method, network flow controller 1810 simply steps through the servers in the cluster and selects the next one in sequence regardless of actual server loads. Servers are held in a circular list structure, with position determined by the order of configuration.

In the least-used flow method, network flow controller 1810 selects the server that has been forwarded the least amount of traffic from clients. Return traffic from the server is not considered in the determination.

In the weighted method, network flow controller 1810 selects the least-loaded server within the cluster based on the user-assigned server weight and the measured server load.

Session persistence continues to be maintained for all traffic-distribution methods.

The network flow controller 1810 determines server loads by using a variety of techniques in two general categories, non-intrusive and intrusive. In the non-intrusive techniques, the server-load metric is independent of the server, operating system, and hardware platform. Non-intrusive techniques use information from external to the server. Two non-intrusive server-load metrics are probe response-time and network-utilization metrics.

In the probe response-time metric, the network flow controller 1810 tracks the time to probe a server and is available regardless of the number of servers configured on the port.

Network-utilization metric involves tracking the amount of data transferred between network flow controller 1810 and the server in terms of packets and bytes sent and received in both directions. Network utilization can only be used when a single server is configured on the port.

The intrusive category of server load metric employs the administrator to install software on the server, and has the advantage of accurately determining the load based on internal server information. The software component that loads onto the server is called a server agent. The server agent calculates the load based on CPU utilization. Windows NT and UNIX server platforms are supported.

The administrator configures the server load-determination method based on the server operating environment.

The network flow controller 1810 arranges servers 1812 into clusters. Granularity of the traffic distribution performed by network flow controller 1810 is configurable by the administrator. In an illustrative system, by default, network flow controller 1810 holds information for 1024 aggregated flows for each cluster and supports a maximum of 64 such clusters.

For administrators having a requirement for traffic distribution to occur with a finer granularity, network flow controller 1810 may be configured to hold information for up to 116384 aggregated flows. Using fine granularity, network flow controller 1810 supports a maximum of 4 clusters.

In situations where the number of supported clusters is important, network flow controller 1810 can be configured to support a maximum of 1024 clusters with no more than 12048 servers total, each with holding information for 64 aggregated flows.

Each cluster is assigned a unique 1P address. The same IP address is also assigned to each server within that cluster. The network flow controller 1810 does not perform IP address translation as part of traffic-distribution techniques.

Graceful server takedown introduces the concept of secondary flows. Normally, a flow is designed to supply all IP addresses that map to the assigned server. A secondary flow is designed for a specific IP address only. Secondary flows exist only during graceful take-down of a server. During normal server operation, secondary flows do not exist. Secondary flows can be considered as branching off, as a linked-list, from an associated cluster flow. Only flows within a cluster that are affected by a server takedown have associated secondary flows. The number of secondary flows associated with a cluster flow depends on the number of different IP addresses that are mapped into the flow within a given period. For cluster flows that are mapped to only a small number of IP addresses, the length of the secondary flow list is small. The available runtime resources determine the upper limit on the number of secondary flows.

The network flow controller 1810 permits the administrator to configure and connect multiple servers 1812 per port, permitting usage in an environment with a larger number of servers without "stacking" multiple units. A single network flow controller 1810 unit, or a pair when used in a fail-over topology, can cluster a large number of servers. Multiple server configuration exploits the "all/IP" technology used in network flow controller 1810.

The network flow controller 1810 avoids usage of Network Address Translation (NAT) and NAT's inherent performance penalties and interoperability drawbacks by aliasing the interface IP address on the server. Aliasing of the cluster IP address on the server IP loopback interface allows a server to belong to many clusters and reside on the same LAN segment as other servers, even other servers that belong to the same cluster, without creating problems from duplication of IP addresses.

In an illustrative implementation, the network flow controller 1810 supports up to 1024 clusters with up to 12048 total servers. No restriction is imposed on the number of servers on a single port so long as the total number of configured servers in the system does not exceed the imposed overall limit.

The network flow controller 1810 allows an administrator to configure a number of "hot-standby servers" within the cluster most effectively for high-availability conditions with no possibility of server replication. The network flow controller 1810 forwards traffic only to operational non-hot-standby servers in a cluster until the traffic exceeds the capacity of the non-hot-standby servers. Hot-standby servers remain idle, although the network follow controller 1810 does execute health-monitoring of the idle hot-standby servers. Once the capacity of the non-hot-standby servers is exceeded, network flow controller 1810 selects a hot-standby server to forward cluster traffic for processing. In an illustrative implementation, network flow controller 1810 selects hot-standby servers in a round-robin order based on the order of configuration.

The network flow controller 1810 also controls traffic to direct specific types of traffic exclusively to one or more dedicated servers in a cluster. A dedicated server is a server that, though replicated, performs a unique service that is not offered by other servers. In one example of an implementation, an administrator can configure up to five different port numbers and respective associated servers in the cluster. The network flow controller 1810 only forwards traffic of the defined types to the specified dedicated server regardless of server loads.

The network flow controller 1810 supports application probes. Application probes allow an administrator to control analysis of the network flow controller 1810 in determining health of servers within a cluster. The administrator completely controls techniques for testing the cluster and defining a standard for a good response.

The network flow controller 1810 supports an application probe for the HTTP server. At regular intervals defined by a preset "keep-alive" interval, network flow controller 1810 issues a GET request to the management IP address assigned to the server. The administrator typically configures the application probe according to port, requested URL, and response codes that are not indicative of an error condition.

The network flow controller 1810 also supports an application probe that uses only ARP requests and replies. At regular intervals, defined by the "keep-alive" interval, network flow controller 1810 issues an ARP Request to the server.

The network flow controller 1810 is generally located at a key position within a network topology and is well-suited to enforce policies included traffic redirection. The network flow controller 1810 can direct traffic to Proxy Servers that cache the contents of frequently-accessed web pages locally, improving response time to a web-browser user and freeing expensive (WAN) network bandwidth for the network administrator. Proxy Server operation is both disk and CPU intensive, so that Proxy Servers are prime candidates for clustering. Effectiveness of a Proxy Server is proportional to usage. Users must configure the web browser to directly interact with the Proxy Servers rather than accessing a web-site directly. When the administrator cannot enforce a user's voluntary use of Proxy Servers, network flow controller 1810 can be used to transparently redirect HTTP traffic to a Proxy Server without the user configuring the web-browser. Redirection is applied to traffic originating from network-type ports, not server or router ports, and is destined for user-configured router IP addresses.

The network flow controller 1810 not only controls HTTP Redirection, which is a well-understood and accepted concept, but also controls redirection for other types of IP traffic. IP Redirection is applied to traffic originating from network-type ports, not server or router ports, and is destined for user-configured router IP addresses.

The network flow controller 1810 implements server fault-intolerance within a cluster by periodically checking individual servers within a cluster to ensure that the servers are operational. At regular intervals, e.g., a selectable "keep-alive" interval, network flow controller 1810 sends application probes to each server and waits for a reply. If a server does not respond to a selectable down-count number of consecutive application probes, the server is classed within a "down" condition.

Whenever a server fails to respond to an application probe, network flow controller 1810 uses other servers within the cluster to handle any assigned flows. Network flow controller 1810 reassigns any flows that are currently assigned to the server to the most suitable servers within the cluster. Active client-server sessions using the server are affected.

Even while a server is down, network flow controller 1810 continues to send applications probes to ensure detection of the server upon recovery. A selectable "bring-up" count number of consecutive replies is received before network flow controller 1810 marks the server as up again. When a failed server is again usable, network flow controller 1810 does not automatically reassign any previously-assigned flows that would adversely affect any active client-server sessions. The again-usable server, probably the least-loaded in the cluster, is used only in new flow assignments.

The network flow controller 1810 implements router fault-tolerance through usage of router pools. A cluster is considered to be a group of functionally-equivalent servers. Similarly, a router pool is a group of route-equivalent routers. All routers within a router pool can route packets to the same destinations, although routing paths may vary. For example, one router in a pool may have access to a dedicated leased-line connection. Another router may use a dial-up connection.

The network flow controller 1810 periodically checks routers in a pool to ensure an operational condition. Two techniques for detecting the operational state of routers are the Address Resolution Protocol (ARP) and ICMP Router Discovery Protocol (IRDP).

The network flow controller 1810 implements ARP by sending, at regular intervals, ARP Request packets to each router in the pool, then waiting for a reply. If a router does not respond to a down-count number of consecutive ARP Requests, a router is marked as down. While a router is down, network flow controller 1810 continues to send ARP Request to the inoperative router. A "bring-up" count number of consecutive replies is received before network flow controller 1810 marks the router as up again.

Routers periodically multicast ICMP Router Advertisement messages advertising interface addresses. The network flow controller 1810 implements IRDP by detecting the advertisement messages and recording the message receipt time and the TTL value for each router address included in the messages. The router is considered to be down if a second ICMP Router Advertisement is not received fore the TTL elapses. The network flow controller 1810 does not transmit any ICMP Router Solicitation messages, but simply waits for the messages, possibly extending the time for determining whether a router is operational.

Router fault-tolerance allows servers to retain network connectivity without reconfiguration. The servers are not directly affected when outbound traffic is redirected by network flow controller 1810 to an alternative, but route-equivalent, router. While the routers are operational, network flow controller 1810 directs switches to perform packet forwarding from the servers to the routers. The network flow controller 1810 does not process the packets. When network flow controller 1810 detects that a router has failed or is informed by the administrator that a router is down, network flow controller 1810 redirects any packets received from the servers and bound for the failed router to another router in the pool. Redirection occurs at Layer-2. The network flow controller 1810 rewrites the destination MAC address of any packet that is meant for the inoperative router. The replacement destination MAC address is the MAC address of another router from the router pool. If no operational routers remain within a router pool, network flow controller 1810 discards the traffic.

The network flow controller 1810 determines which router replaces a failed router by simply choosing the first operational router within the pool. The network flow controller 1810 contains no configurable weightings for routers to indicate usage preference. All routers are treated equally.

When an inoperative router becomes operational again, network flow controller 1810 stops redirecting the traffic to the other router from the pool. The network flow controller 1810 returns to using ordinary switching to forward packets to the router. The network flow controller 1810 then terminates packet processing.

The network flow controller 180 uses Proxy ARP to effectively "hide" servers within a cluster. The network flow controller 1810 ensures that devices connected to the Router Ports interact with the proxy rather than directly with the servers for any cluster-related activity.

Network flow controller 1810 uses Proxy ARP to ensure that packets destined for any of the cluster IP addresses are sent to network flow controller 1810 rather than directly to the servers within the clusters. When a router attempts to send a packet to a cluster but is not informed of the destination MAC address, the router sends an ARP Request packet requesting a station with the IP address indicated in the ARP Request packet to reply with station MAC address. The network flow controller 1810 responds to an ARP Request packet with a cluster IP address received on a Router Port by sending the MAC address of the network flow controller 1810. The router then uses the network flow controller 1810 MAC address when sending packets for the cluster IP address. The network flow controller 1810 receives all traffic from Router Ports directed at clusters.

When a server attempts to send a packet to a particular destination IP address on the same subnet but does not have the appropriate destination MAC address, the server sends out an ARP Request packet. The network flow controller 1810, on receiving an ARP Request from a server, intercepts the ARP Request. The network flow controller 1810 modifies the ARP Request source information, including MAC and IP addresses, such that the information appears to have been sent by network flow controller 1810 rather than by one of the servers. The modified ARP Request is then broadcast. Upon receiving a reply, network flow controller 1810 modifies the ARP Reply destination information, including MAC and IP addresses. A copy of the ARP Reply is sent back directly to each server within the cluster.

If network flow controller 1810 receives an ARP Request from a server for a failed router, network flow controller 1810 replies back with the MAC address of an alternate operational router from the pool. The server functions as though the failed router is operational, and sends traffic to the alternate router.

Some servers use ARP to detect duplicate IP address assignments upon power-up. The servers send ARP Request packets requesting a response from the host with the same address. No reply is received if the server IP address is unique within the sub-network. The network flow controller 1810 ensures that a server in a cluster does not detect other servers within the cluster. The network flow controller 1810 discards any ARP Request packet that originated from a server; for example, the source IP address is the address of the cluster, and is targeted to the cluster IP address or any server management IP address.

Network flow controller 1810 supports two fail-over modes of operation to eliminate single points of failure, including an active-standby mode and an active—active mode. In active-standby mode, an active network flow controller (A) has a hot standby network flow controller unit (B) constantly monitoring health and status of the A unit. The standby network flow controller unit (B) is able to take over in less than 10 seconds, after detecting a failure. The active-standby fail-over solution fits easily into an existing network topology. The administrator need not change network interface cards, server configuration, cables, router configuration, or software to employ a hot-standby fail-over solution.

The embodiments of the networks described above are illustrative of the principles of this invention and are not intended to limit the invention to the particular embodiments described. For example, in light of the present disclosure, those skilled in the art of networking can implement other embodiments of the switch circuit using a crossbar switch without undue experimentation. Further, those skilled in the art can implement other embodiments of the switch circuit for local networks having more than two servers and firewalls. Accordingly, while the preferred embodiments of the invention have been illustrated and described, it will be appreciated that, in view of the present disclosure, various changes can be made therein without departing from the spirit and scope of the invention.

The invention claimed is:

1. A method for providing firewall fault-tolerance in a network, the network including a plurality of firewalls, at least one server and at least one network flowswitch, the method comprising:
   detecting in the network flowswitch an occurrence of a failed firewall of the plurality of firewalls each having a different fixed media access control (MAC) address;
   detecting in the network flowswitch a packet from the server directed to the failed firewall after the occurrence of a failed firewall is detected;
   changing a MAC address of the packet to the fixed MAC address of a functional firewall of the plurality of firewalls when the packet is detected; and
   relaying the packet to the functional firewall after the MAC address of the packet is changed.

2. The method of claim 1 wherein the network comprises a plurality of servers.

3. The method of claim 2 wherein relaying the packet to the functional firewall comprises relaying the packet to the functional firewall over a medium that is not shred with packets directed to other firewalls or servers.

4. The method of claim 1 wherein said detecting an occurrence of a failed firewall comprises sending a request to the plurality of firewalls, wherein an absence of a response from a particular firewall of the plurality of firewalls is indicative of a failure of the particular firewall.

5. The method of claim 1 wherein said detecting an occurrence of a failed firewall comprises sending at least one Address Resolution Protocol (ARP) request to each firewall of the plurality of firewalls, wherein an absence of a reply to an ARP request from a particular firewall of the plurality of firewalls is indicative of a failure of the particular firewall.

6. The method of claim 1 further comprising:
   detecting an address resolution protocol (ARP) request from the server to the failed firewall; and
   responding to the ARP request with the fixed MAC address of the functional firewall, whereby the server is configured to send subsequent outbound packets with the fixed MAC address of the functional firewall.

7. The method of claim 1 wherein said detecting an occurrence of a failed firewall comprises sending ICMP echo packets to each firewall of the plurality of firewalls and wherein an absence of a response from a particular firewall of the plurality of firewalls during a predetermined interval is indicative of a failure of the particular firewall.

8. The method of claim 1 further comprising:
detecting a recovery of the failed firewall, the failed firewall becoming a recovered firewall; and
terminating said detecting a packet from the server directed to the failed firewall when said failed firewall recovers.

9. The method of claim 8 further comprising waiting for a time-out period to expire after said detecting when the failed firewall recovers.

10. The method of claim 9 wherein the time-out period is greater than or equal to a time period needed for the recovered firewall to learn routes to all known clients.

11. The method of claim 8 wherein said detecting a recovery of the failed firewall comprises sending to the failed firewall a request, and a response from the failed firewall is indicative of a recovery of the failed firewall.

12. The method of claim 8 wherein said detecting a recovery of the failed firewall comprises detecting a packet from the failed firewall in response to a request.

13. The method of claim 8 wherein said detecting a recovery of the failed firewall comprising sending ARP requests to each firewall of the plurality of firewalls, wherein an occurrence of a reply to an ARP request from the failed firewall is indicative of a recovery of the failed firewall.

14. The method of claim 1 wherein packets are transferred between the server and a firewall of the plurality of firewalls through a switch circuit.

15. The method of claim 14 wherein the switch circuit comprises a switched Ethernet circuit.

16. An apparatus for providing firewall fault-tolerance in a network, the network including a plurality of firewalls, at least one server and at least one network flowswitch, the apparatus comprising:
means for detecting an occurrence of a failed firewall in the plurality of firewalls each having a difference fixed media access control (MAC) address;
means for detecting a packet from the server directed to the failed firewall after the failed firewall is detected;
means for changing a MAC address of the packet to the fixed MAC address of a functional firewall of the plurality of firewalls when the packet is detected; and
means for relaying the packet to the functional firewall after the MAC address of the packet is changed.

17. The apparatus of claim 16 further comprising:
means for detecting an address resolution protocol (ARP) request from the server to the failed firewall; and
means for responding to the ARP request with the fixed MAC address of the functional firewall, wherein the server sends subsequent outbound packets with the fixed MAC address of the functional firewall.

18. The apparatus of claim 16 wherein said means for detecting a failed firewall comprises means for transmitting a request to the plurality of firewalls, wherein an absence of a reply from a particular firewall of the plurality of firewalls is indicative of a failure of the particular firewall.

19. The apparatus of claim 16 wherein said means for detecting a failed firewall comprises means for sending ARP requests to each firewall of the plurality of firewalls, wherein an absence of a reply to an ARP request from a particular firewall of the plurality of firewalls is indicative of a failure of the particular firewall.

20. The apparatus of claim 16 further comprising:
means for detecting a recovery of the failed firewall, the failed firewall becoming a recovered firewall; and
means for disabling said means for detecting a packet from the server directed to the failed firewall when said failed firewall recovers.

21. The apparatus of claim 20 wherein said means for detecting a recovery of the failed firewall comprises means for transmitting a request to the plurality of firewalls, wherein a response from the failed firewall is indicative of recovery of the failed firewall.

22. The apparatus of claim 16 wherein said means for detecting a recovery of the failed firewall comprises means for sending ARP requests to each firewall of the plurality of firewalls, wherein an occurrence of a replay to an ARP request from the failed firewall is indicative of a recovery of the failed firewall.

23. A network having firewall fault-tolerance, the network configured to be coupled to a network backbone, the network comprising:
a switch circuit;
a first firewall coupled to said switch circuit and the network backbone, said first firewall having a fixed media access control (MAC) address;
a second firewall coupled to said switch circuit and the network backbone, said second firewall having a fixed MAC address different from the fixed MAC address of the first firewall; and
a server coupled to the switch circuit,
wherein the switch circuit is configured to detect when the first firewall fails, the switch circuit being further configured to monitor packets sent by the server to the first firewall and to change in the packet the fixed MAC address of failed said first firewall to the fixed MAC address of functional said second firewall and relay the packet to the functional second firewall after changing the fixed MAC address of the first firewall to the fixed MAC address of the second firewall.

24. The network of claim 23 further comprising a plurality of servers, the plurality of servers including the server.

25. The network of claim 23 wherein the switch circuit is configured to detect a failed firewall by transmitting a request to the first and second firewalls, wherein an absence of a reply from a particular firewall of the first and second firewalls is indicative of a failure of the particular firewall.

26. The network of claim 23 wherein the switch circuit is configured to detect a failed firewall by sending ARP requests to the first and second firewalls, wherein an absence of a replay to an ARP request from a particular firewall of the first and second of firewalls is indicative of a failure of the particular firewall.

27. The network of claim 23 wherein the switch circuit is configured to detect a failed firewall by sending ICMP echo requests to the first and second firewalls, wherein an absence of a reply to an ICMP echo request from a particular firewall of the first and second of firewalls is indicative of a failure of the particular firewall.

28. The network of claim 23 wherein the switch circuit is configured to detect a failed firewall by monitoring responses from the firewalls to requests sent at predetermined intervals.

29. The network of claim 23 wherein the switch circuit is further configured to:

detect an address resolution protocol (ARP) request from the server to the first firewall; and respond to the ARP request with the fixed MAC address of the second firewall, whereby the server sends subsequent outbound packets with the fixed MAC address of the second firewall.

30. The network of claim 23 wherein the switch circuit is further configured to:

detect when the first firewall recovers; and terminate monitoring for packets sent by the server to the first firewall after the first firewall recovers.

31. The network of claim 30 wherein the switch circuit is further configured to wait for a time-out period to expire after detecting when the first firewall recovers.

32. The network of claim 31 wherein the time-out period is greater than or equal to a time period needed for the recovered first firewall to learn routes to all known clients.

33. The network of claim 30 wherein the switch circuit is configured to detect a recovery of the failed firewall by transmitting a request to the first and second firewalls, wherein receipt of a response from the failed firewall is indicative of a recovery of the failed firewall.

34. The network of claim 30 wherein the switch circuit is configured to detect a recovery of the failed firewall by sending ARP requests to the first and second firewalls, wherein an occurrence of a reply to an ARP request from the failed firewall is indicative of a recovery of the failed firewall.

35. The network of claim 30 wherein the switch circuit is configured to detect a recovery of the failed firewall by sending ICMP echo requests to the first and second firewalls, wherein an occurrence of a reply to an ICMP echo request from the failed firewall is indicative of a recovery of the failed firewall.

36. The network of claim 35 wherein the switch circuit is configured to provide full-duplex communication between the first firewall and the server.

37. The network of claim 35 wherein the switch circuit comprises a switched Ethernet circuit.

38. The network of claim 23 wherein packets are transferred between the server and the first firewall through the switch circuit, and between the server and the second firewall through the switch circuit.

39. A method for providing fault-tolerance in a network, the network including a plurality of firewalls each having a different fixed media access control (MAC) address, the method comprising:

generating a request message on a first side of a first firewall in the plurality of firewalls;

sending the request message through the first firewall to a second side of the first firewall; and processing an absence of a reply from the second side to the request message as a failure of the first firewall, including changing, in a detected packet, the fixed MAC address of failed said first firewall to the fixed MAC address of a functional second firewall of the plurality of firewalls, and relaying the packet to the functional second firewall after changing the MAC address in the packet.

40. The method of claim 39 further comprising:

maintaining in a first memory on said first side a first functional status for each firewall;

maintaining in a second memory on said second side a second functional status for each firewall; and wherein said first functional status is identical to said second functional status.

41. The method of claim 40 further comprising:

maintaining session information in a firewall for each session between computers separated by the firewall.

42. The method of claim 39 further comprising:

sending the request message through the first firewall to a third side of the first firewall; and processing an absence of a reply from the third side to the request message as a failure of the first firewall.

43. The method of claim 39 wherein:

the generating, sending and processing are performed in a switch circuit.

44. The method of claim 39 further comprising:

performing Network Address Translation (NAT) in the first firewall; and adding a rule in the first firewall to maintain unchanged an internet protocol (IP) address of a source of the request message.

45. The method of claim 39 further comprising:

receiving a request on a port; and sending a reply on said port.

46. A network having fault-tolerance, the network comprising:

a first switch circuit;

a second switch circuit; and a plurality of firewalls each having a different fixed media access control (MAC) address, the plurality of firewalls being coupled to each of the first switch circuit and the second switch circuit, each firewall being coupled to the first switch circuit by a first medium that is not shared with another firewall in the plurality of firewalls and each firewall being coupled to the second switch circuit by a second medium that is not shared with another firewall in the plurality of firewalls; wherein a switch circuit of the first and the second switch circuits responds to a first firewall of the plurality of firewalls being functional by sending a first packet that has the fixed MAC address of the first firewall and is received by said switch circuit to the first firewall, and responds to a failure of the first firewall by replacing in a second packet received by said switch circuit the fixed MAC address of the first firewall with the fixed MAC address of a functional second firewall of the plurality of firewalls and sending the second packet with the replaced MAC address to the second firewall.

47. The network of claim 46 further comprising:

a plurality of first computers, each first computer being coupled to the first switch circuit, each first computer being configured with the media access control (MAC) address of the first firewall, the first firewall being a default gateway for transferring packets outside the network.

48. The network of claim 47 further comprising:

a plurality of second computers, each second computer being coupled to the second switch circuit, each second computer being configured with the MAC address of the first firewall, the first firewall being a default gateway for transferring packets inside the network.

49. The network of claim 46 further comprising:

a plurality of routers coupled to the second switch circuit.

50. The network of claim 46 wherein each of the first switch circuit and the second switch circuit comprises:

a first storage element encoded with a list of the plurality of firewalls; and a second storage element encoded with an identity of a firewall in the plurality as a replacement firewall for any other firewall in the plurality that has failed.

51. The network of claim 46 wherein:

each of the first switch circuit and the second switch circuit is configured to send a request message to the other of the first switch circuit and the second switch circuit; and each of the first switch circuit and the second switch circuit is configured to treat absence of a response to the request message as a failure of a firewall through which the request message was sent.

52. The network of claim 51 wherein:

the request message conforms to an internet protocol selected from the group consisting of:

(a) ping;

(b) address resolution protocol (ARP); and (c) internet message control protocol (ICMP).

53. The network of claim 46 wherein:

the first switch circuit transfers a plurality of packets to the first firewall through a first medium without changing any portion of any packet in the plurality of packets while the first firewall is functional.

54. The network of claim 46 wherein:

the switch circuit replaces in each received packet the fixed MAC address of the first firewall with the MAC address of the second firewall and transfers each modified packet to the second firewall only while the first firewall is nonfunctional.

55. The network of claim 46 wherein each switch circuit comprises a switched Ethernet circuit.

56. The method of providing fault-tolerance in a network, the network including a plurality of firewalls each having a different fixed media access control (MAC) address, the method comprising:

detecting a failure of a first firewall in the plurality of firewalls;

changing, in a packet, the fixed MAC address of failed said first firewall to the fixed MAC address of a functional second firewall of the plurality of firewalls in response to the failure; and relaying the packet to the functional second firewall after changing the MAC address in the packet.

57. The method of claim 56 wherein:

the detecting is performed in a switch circuit.

58. The method of claim 56 further comprising:

receiving the packet after detecting the failure and prior to the replacing.

59. The method of claim 56 further comprising:

transferring a plurality of packets other than the packet, between a host and a firewall in the plurality of firewalls through a switch circuit.

60. The method of claim 59 wherein:

each of the packets contains a first internet protocol (IP) address; and the method does not change the first IP address during transferring of the packets to any of the firewalls.

61. The method of claim 60 wherein:

each of the firewalls has a first side and a second side; and each of the firewalls has the first IP address on the first side and a second IP address on the second side.

62. The method of claim 60 wherein:

the method does not change the MAC address of any of the packets during the transferring, until the detecting of failure.

\* \* \* \* \*

UNITED STATES PATENT AND TRADEMARK OFFICE
CERTIFICATE OF CORRECTION

| | | |
|---|---|---|
| PATENT NO. | : 7,055,173 B1 | Page 1 of 1 |
| APPLICATION NO. | : 09/540238 | |
| DATED | : May 30, 2006 | |
| INVENTOR(S) | : Srinivas Chaganty, Makarand Kale and Satish Bommareddy | |

It is certified that error appears in the above-identified patent and that said Letters Patent is hereby corrected as shown below:

On the title page item (75), Change Inventor "Sathish Bommareddy," to --Satish Bommareddy--.

Signed and Sealed this

Twenty-second Day of August, 2006

JON W. DUDAS
*Director of the United States Patent and Trademark Office*